United States Patent
Oswald et al.

(10) Patent No.: US 6,411,250 B1
(45) Date of Patent: Jun. 25, 2002

(54) ELECTROMAGNETIC SENSOR SYSTEM

(75) Inventors: Gordon Kenneth Andrew Oswald, Huntingdon; Alan Trevor Richardson, Ely; Nicholas John Kerry, Burwell, all of (GB)

(73) Assignee: Cambridge Consultants Limited, Cambridge (GB)

( * ) Notice: Subject to any disclaimer, the term of this patent is extended or adjusted under 35 U.S.C. 154(b) by 0 days.

(21) Appl. No.: 09/486,323

(22) PCT Filed: Sep. 1, 1998

(86) PCT No.: PCT/GB98/02626

§ 371 (c)(1),
(2), (4) Date: May 15, 2000

(87) PCT Pub. No.: WO99/12053

PCT Pub. Date: Mar. 11, 1999

(30) Foreign Application Priority Data

Sep. 1, 1997 (GB) .............................. 9718321

(51) Int. Cl.[7] .............................................. G01S 13/93
(52) U.S. Cl. ...................... 342/70; 342/93; 342/101; 342/159; 342/198
(58) Field of Search .............................. 342/70, 71, 72, 342/89, 90, 91, 92, 93, 101, 111, 115, 116, 159, 162, 192, 195, 196, 198

(56) References Cited

U.S. PATENT DOCUMENTS

| | | | | |
|---|---|---|---|---|
| 3,665,321 A | | 5/1972 | Michnik ..................... 325/478 |
| 3,778,826 A | * | 12/1973 | Flannery et al. .............. 342/71 |
| 3,858,205 A | * | 12/1974 | Ross ........................... 342/21 |
| 4,688,042 A | | 8/1987 | Cronson ....................... 342/19 |
| 5,185,608 A | | 2/1993 | Pozgay ......................... 342/17 |
| 5,280,288 A | | 1/1994 | Sherry ......................... 342/83 |
| 5,339,075 A | * | 8/1994 | Abst et al. ................... 340/903 |
| 5,512,901 A | * | 4/1996 | Chen et al. ................... 342/175 |
| 5,530,447 A | * | 6/1996 | Henderson et al. ........... 342/70 |
| 5,710,555 A | * | 1/1998 | McConnell et al. .......... 340/916 |
| 6,097,332 A | * | 8/2000 | Crosby, II ..................... 342/72 |

FOREIGN PATENT DOCUMENTS

GB     1 583 240     1/1981

* cited by examiner

Primary Examiner—John B. Sotomayor
(74) Attorney, Agent, or Firm—Lee, Mann, Smith, McWilliams, Sweeney & Ohlson

(57) ABSTRACT

A vehicle (160) such as a motor road vehicle is fitted with an electromagnetic sensor system comprising transmitting means (e.g. 4, 1) for transmitting a radio frequency signal, receiving means (e.g. 2, 6) for receiving reflections of said signal from remote objects, sampling means (20, 28) operable to sample the received reflected signal (or a signal derived therefrom), and processing means (e.g. 36) for processing the sampled signal, and operable to detect said reflections in the sampled signal, and to determine information on the presence, position and/or range of said object. The system includes filter means (e.g. 34) for preventing radio signals transmitted by other sources or noise spikes from causing interference which results in spurious detections or indications of range by the processing means.

8 Claims, 19 Drawing Sheets

SYSTEM BLOCK DIAGRAM
SAMPLE INHIBITING

Fig. 1 *Prior Art*

Fig. 17 SYSTEM BLOCK DIAGRAM AGILE PRF

ELECTROMAGNETIC SENSOR SYSTEM

FIELD OF THE INVENTION

This invention relates to an electromagnetic sensor system, and is particularly concerned with dealing with various types of noise which can be received by such a system. The system may be adapted for short range obstacle sensing. Such a system may be installed on a motor road vehicle as part of a collision warning system.

BACKGROUND OF THE INVENTION

A known type of electromagnetic sensor system uses a series of broad band radio frequency pulses to detect the presence and/or motion of objects. Such a system has a pulse generator forming part of a transmitter for transmitting a train of radio frequency pulses. Echoes of those pulses are received by a receiving antenna, the output of which is sampled by a sampler at a succession of sampling periods, each occurring at a predetermined delay after the transmission of a respective pulse. If the reflection of a pulse is received during a given sampling period, this is indicative of the pulse having travelled to the object and returned to the receiver in the predetermined delay, so that it can be deduced that the object is entering or leaving a notional range gate or envelope surrounding the transmitter and receiver.

Examples of such systems are shown in U.S. Pat. No. 5,361,070 (McEwan) and European Patent No EP 469027B (Cambridge Consultants Limited).

In general, the magnitude of the reflected pulses can be small in relation to background noise, and as a result the signals received over the sampling periods can be averaged in order to improve the signal to noise ratio, as is discussed in U.S. Pat. No. 5,361,070.

However such a system is still susceptible to interference from RF spike noise (produced by other systems of the same type, for example) and continuous wave RF signals.

These latter problems are particularly relevant where the system is to be installed in a motor road vehicle, other vehicles may be equipped with similar systems, which generate the noise spikes, and the system is likely to be operated in the vicinity of various sources of continuous wave signals, such as mobile telephone apparatus/vehicle identification systems.

The signals strengths of an echo received by an electromagnetic sensor system from a target of cross-section e at range R is given by the following expression:

$$S=PGA\sigma/(4\pi R^2)^2$$

where PGA is power-gain-area product for the system.

If the target is equipped with a similar system, then there is the possibility that a pulse transmitted by the target will arrive at the receiver during a sampling period. The signal strength of such an interfering pulse is:

$$I=PGA/(4\pi R^2)$$

so that the signal-to-noise ratio, SNR, is:

$$SNR=\sigma/(4\pi R^2)$$

For an automotive application typical values might be $\sigma=0.1$ m$^2\cdot$R$=30$ m giving:

$$SNR=-50 \text{ dB}$$

compared with a required signal-to-noise ratio typically of at least +15 dB for acceptable detection performance.

This signal-to-noise ratio will be improved by averaging the signals received over a large number of sampling periods, but even if $10^4$ samples are averaged, the processing gain will only be 40 dB. Even if only one interfering pulse is received per averaging period, the averaged SNR will be −10 dB which might still be too low.

An impulse modulated electromagnetic sensor system operates at a pulse repetition frequency (PRF) typically of order 1–10 MHz: both the pulse generator in the transmitter and the sampler in the receiver will operate at this frequency. The audio frequency (AF) output from the sampler will have a bandwidth from DC to the Nyquist frequency (one half of the PRF).

For many applications, and in particular for automotive applications, the target echo occupies only a fraction of the AF bandwidth. The echo bandwidth is related to the wavelength of the signature (typically 3 to 30 cm) and the relative speed of the target (say 0 to 100 m/s) from which the pulses are reflected, giving a bandwidth of order 3.3 kHz. The output signal processing can include a low-pass filtering stage to improve the signal-to-noise ratio by rejecting noise (eg thermal noise in the receiver) outside the AF band.

The receive antenna will pick up any external RF signal, for example from a nearby radio transmitter. Of particular concern in automotive applications are on-car or roadside transmitters such as mobile phones or tolling vehicle identification systems. RF filters in the receiver can suppress any signal outside the operational bandwidth of the system, but other signals will be aliased into the AF output. For example, if PRF is 1 MHz and the operational bandwidth includes frequencies around 2GHz, then a signal at 2.000001 GHz will be aliased to 1 kHz and a signal at 2.000100 GHz will be aliased to 100 kHz. The low-pass filter (presumed DC to 3.3 kHz) in the output processing will reject the second signal but not the first.

In practice, modulated RF signals have finite bandwidth, typically 100 kHz for GSM systems, with corresponding channel separations of 200 kHz. An FM signal with a centre frequency of 2 GHz will appear in the AF output as energy distributed over the DC–50 kHz band, and a proportion of this energy will be passed by the low-pass filter. A signal with a centre frequency around 2.0002 GHz will appear in the AF output as energy distributed over 150–250 kHz, and should be rejected by the low pass filter.

Thus, in an impulse modulated electromagnetic sensor system the reflected signature from a target can be contaminated by continuous wave (CW) or amplitude/frequency /phase-modulated continuous wave (narrowband) RF signals which appear in the AF output. If their amplitude is sufficiently large they will obscure the wanted echo and prevent the target from being detected.

The invention seeks to provide various methods and apparatuses which are less susceptible to interference by either or both these types of noise.

BRIEF DESCRIPTION OF THE INVENTION

According to a first aspect of the invention, there is provided an electromagnetic sensor system comprising transmitting means for transmitting a train of radio frequency pulses, receiving means for receiving reflections of said pulses from remote objects, sampling means for sampling the output of the receiving means, processing means connected to the sampling means, and operable to detect said reflections in the sampled signal, and to determine information on the presence or range of said object, and gating means for preventing radio pulses transmitted by other sources or noise spikes from causing interference which results in spurious detections or indications of range by the processing means.

Thus, a number of such systems may be used in proximity to each other since the gating means prevents the pulses transmitted by one of the systems being mistaken by another system for reflections of pulses transmitted by that other system. Such mistakes would otherwise give rise to spurious detections or other inaccuracies in the output of the processing means.

The gating means may be arranged to operate by monitoring signals received by the receiving means, and preventing or inhibiting the operation of the sampling means when the amplitude of said signals exceeds a threshold.

As is explained above, reflections of signals transmitted by the transmitting means will make a smaller contribution to the amplitude of the output of the receiving means than will transmitted pulses received directly, (i.e. without an intervening reflection) from other systems. Consequently, the above thresholding procedure will discriminate between most genuine reflections and other pulses, which are transmitted by other systems and which are received directly by the receiving means.

Preferably, the gating means comprises a threshold detector for determining whether the received signal is above said threshold and, if it is not, generating an enabling signal for enabling the sampler to operate, and delay means for delaying the passage of the received signal from the receiving means to the sampling means so that the operation of the threshold detector and the arrival of the signal at the sampling means are synchronised.

Alternatively, the filter means may be operable selectively to limit the amplitude of the input to the sampling means by truncating any peaks in the sampled signal which would otherwise exceed said threshold, so that the maximum amplitude of the input to the sampling means corresponds to said threshold.

In this case, the filter means allows the transmitted pulses received directly from other systems to reach the processing means, but ensures that those signals are inhibited so as to cause less serious interference.

The level of the threshold is ideally such that all transmitted pulses received directly from other systems, but as few as possible of the genuine reflected pulses exceed the threshold.

In either case the filtering means preferably further comprises threshold setting means for adjusting the threshold applied by the threshold detector to ensure that the majority of genuine reflected pulses lie below the threshold.

Preferably, the threshold setting means is operable to analyse the statistical distribution of the amplitudes of the noise received by the receiving means at a plurality of sample times, and to set the threshold at a level which is dependent upon the spread of the distribution.

To that end, the threshold setting means is preferably connected to the output of the sampling means.

In that connection, the threshold setting means may be so arranged as to set a threshold which is approximately three standard deviations above the mean of said distribution.

The system may be so arranged that if the statistical behaviour of the noise exhibits a given characteristic a warning signal is generated.

Thus, the threshold setting means can take account of variations in the background noise levels which might otherwise result in the application of a threshold which is too high or too low.

The system may be adapted for installation on a motor road vehicle, and may be operable to detect the approach of objects or other vehicles to said vehicle, the system further including alarm means connected to the signal processing means for warning the driver of any risk of collision with said obstacles or other vehicles.

According to a second aspect of the invention, there is provided an electromagnetic sensor system comprising transmitting means for transmitting a train of radio frequency pulses, receiving means for receiving reflections of said pulses from remote objects, sampling means for sampling the output of the receiving means during each of a succession of sampling periods, processing means for analysing the output from the sampling means to provide an indication of at least the presence of any such object and its distance from the receiving means, the system also including filtering means for detecting intermittent continuous wave radio frequency signals of frequencies which would cause interference in the sampler output and, in response to any such detection, preventing or inhibiting the operation of the system so that said continuous wave signals do not give rise to spurious detections of objects or incorrect indications of distances by the processing means.

This aspect of the invention exploits the fact that many radio communications systems use non-continuous transmission. For example, a mobile phone operating in accordance with a Time Domain Multiple Access (TDMA) protocol operates with a 1-in-7 duty cycle at 270 Hz. Thus, if the mobile telephones' allocated radio channel falls into the operational band of the impulse electromagnetic sensor system, the filter means will. in effect, blind the system for approximately 4 ms in every 30 ms. This corresponds to relatively small loss of information which can be readily accommodated by the processing means.

The filtering means may be arranged Lo inhibit the operation of the system whenever RF energy of a frequency lying in a predetermined band is detected. Alternatively, the filtering means may be arranged to determine the periodic energy pattern in such an RF signal, and to inhibit the system when interference is due to be present.

Preferably, the filtering means is operable to inhibit the operation of the system by interrupting the operation of the sampling means, or limiting the amplitude of the output sampling means.

Preferably, the filtering means is connected to the receiving means and is operable to detect said continuous wave RF signals by monitoring the output to the receiving means.

The system may include delay means connected in series between the sampling means and the receiving means, and downstream of the connection of the filtering means, in order to synchronise the operation of the filtering means with the supply of the signal to the sampling means.

However, the aforementioned feature can be dispensed with where the filtering means determines the frequency of occurrence of the continuous wave signal and in effect anticipate when the signal will be present.

Conveniently, the filtering means comprises integration means for determining the total energy of RF signals, within said band of frequencies, received by the receiving means over a given integration period, the filtering means being operable in response to an increase in said detected energy, said increase being indicative of the presence of a continuous wave interference signal.

According to a third aspect of the invention there is provided a method of operating an electromagnetic sensor system, the method comprising the steps of transmitting a train of radio frequency pulses at a given pulse repetition frequency, causing a sampler to sample the output of a receiver at each of a succession of sampling periods occurring at a sampling frequency which is a multiple of the pulse repetition frequency, forming from the output of the sampler a first channel in the spectrum of which any continuous wave interference radio signal of a frequency which is a multiple of the sampling frequency and/or the pulse repetition frequency is aliased to a band in the sampler output in which the reflected signals appear, forming a second channel in the spectrum of which said continuous wave interference signal is either aliased into a higher band or into the same band as in the first channel, depending on the frequency of the interference signal, and in the former case outputting a signal by filtering the second channel to remove any such interference signal and in the latter case outputting a signal by combining the first and second channels in such a way as to cancel out any such interference signal appearing in said band of the reflections.

In practice, the reflected signals would appear in a number of bands in the sampler output, including a band from DC to a relatively low frequency (for example 3.3 kHz). A continuous wave interference signal of a radio frequency which is an odd multiple of the sampling rate will be aliased to a much higher band of frequencies, and can therefore be removed by low pass filtering of the second channel. However, a continuous wave interference signal of a frequency which is an even multiple of the sampling rate will be aliased to the same low frequency band. However, such since a signal also appears in the first channel, it can be cancelled out by, for example, subtraction of one channel from the other (if the amplitude of the aliased signal is substantially the same in each channel).

Preferably, the step of forming the first channel comprises selecting samples only for periods in which any reflections of transmitted pulses in the range of the system cannot be received, the second channel being formed from all the samples produced by the sampler.

Where the channels are to be processed digitally, preferably the forming of the first channel further comprises a step of creating additional samples by a process of interpolation from the selected samples so that, the first and second channels have the same sampling rate.

Conveniently, the sampling rate is twice the pulse repetition frequency, the first channel being formed from samples obtained during alternate sampling periods.

Preferably, the method comprises the further steps of generating a third channel by subtracting the first channel from the second channel, comparing the amounts of energy in the second and third channels, and forming an output signal from which whichever of those channels has the lower energy.

According to this aspect of the invention, there is also provided an electromagnetic sensor system for performing the aforementioned method, the system comprising transmitter means for generating a series of radio frequency pulses at a given pulse repetition frequency, receiving means for receiving reflections of said pulses from objects in the remainder of the system, sampling means for sampling the output of the receiving means at a rate which is a multiple of the pulse repetition frequency so that some of the samples occur periodically when reflections of the transmitted pulses in the range of the system are not received by the receiving means, signal processing means for forming a first channel from said some samples, a second channel from all the samples in the output of the sampler, and a third channel formed by subtracting the first channel from the second channel so as to remove any continuous wave interference signal which has been aliased in the output of the sampling means to the band in which any reflections are present, the apparatus further comprising comparator means for determining which of the second and third channel contains the least energy and forming an output from that channel.

According to a fourth aspect of the invention, there is provided an electromagnetic sensor system comprising transmission means for transmitting a train of radio pulses, receiving means for receiving reflections of said pulses, sampling means for sampling the output of the receiving means over a succession of sampling periods, each corresponding to a respective pulse, detection means for detecting the presence of any continuous wave radio interference signal and control means for so controlling the pulse repetition frequency and sampling rates at any such interference signal is aliased, in the output of the sampling means, to a band of frequencies outside the band in which said reflections appear.

Preferably, the control means is operable to control the sampling means and the transmission means in such a way that the sampling rate is the same as the pulse repetition frequency, the control means also being operable to select said frequency so that the interference signal is aliased to a higher band of frequencies than that in which the reflections appear.

In this case, the apparatus preferably includes a low pass filter for removing said interference signal from the sampler output.

According to this aspect of the invention, there is also provided a method of operating an electromagnetic sensor system, the method comprising the steps of transmitting succession of radio pulses, sampling the output of a receiver, arranged to receive reflections of said pulses, over a succession of sampling periods at a given sampling rate, determining whether the receiver has received any continuous wave interference signal which would be aliased into the band of the sampler output in which said reflections appear and, if such a signal has been detected, altering the pulse repetition frequency and sampling rate so that the interference signal is aliased to a band outside that in which the reflected signals appear.

Preferably, the pulse repetition frequency and sampling rate are chosen so that any such interference signal is aliased substantially to the Nyquist frequency in sampler output.

Preferably, however, the interferer is aliased to a frequency just below tile Nyquist frequency so that at least a first harmonic of the interference signal (and preferably also the second and third harmonics) also lie outside the band in which the reflected signals appear.

The pulse repetition frequency and sampling rate can be controlled to any value in a continuum. Alternatively, the pulse repetition frequency and sampling rate can be a selected one of a number of predetermined frequencies for any given band of interference signal.

According to a fifth aspect of the invention, there is provided an electromagnetic sensor system comprising transmitting means for transmitting a train of radio pulses. receiving means for receiving reflections of those pulses, sampling means for sampling the output of the receiving means over a succession of sampling periods, and processing means for processing the output of the sampling means to determine information on the presence or range of objects from which the pulses are reflected, wherein the sampling means comprises a plurality of samplers and filtering means for band-pass filtering the signal received by the receiving means so that each sampler is supplied with an RF signal lying in a respective one of a number of frequency bands, the sampler being operable to select for analysis the sampler output which has the lowest energy.

The invention also lies in a vehicle fitted with a system in accordance with any of the preceding aspects of the invention.

BRIEF DESCRIPTION OF THE DRAWINGS

The invention will now be described, by way of example only, with reference to the accompanying drawings in which.

DETAILED DESCRIPTION

Figure 1:
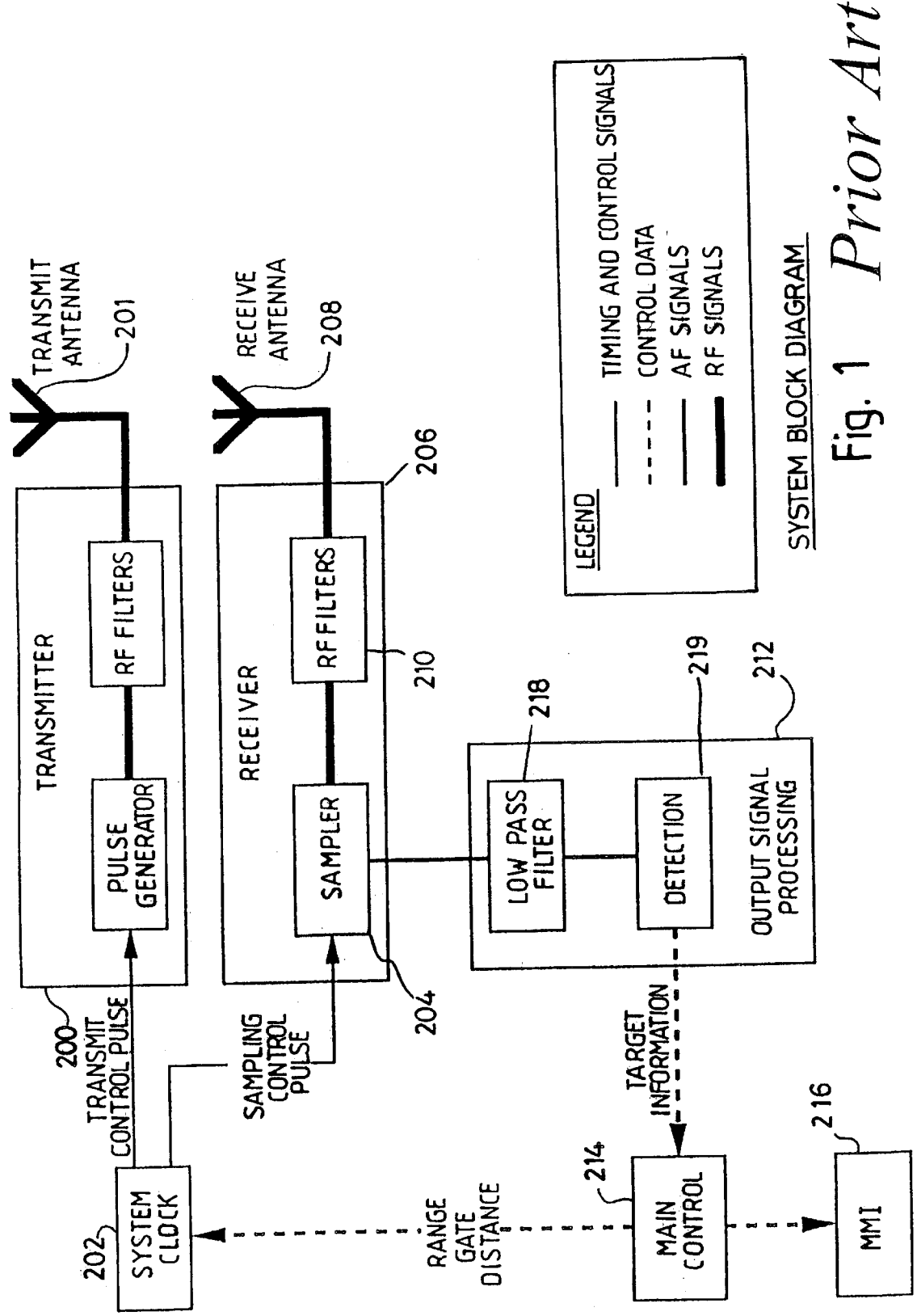
FIG. 1 is a block diagram of a basic impulse modulated electromagnetic sensor system.

FIG. 1 shows a basic type of impulse modulated electromagnetic sensor system which does not have the noise countering facilities of the systems according to any aspect of the invention. This system has a transmitter 200, which is the same as the transmitter of the other systems described below and which carries an antenna 201 to transmit a train of radio frequency pulses in response to control signals from a system clock 202 also of the type used in the other systems.

The clock 202 also triggers a sampler 204 which forms part of a receiver 206. The sampler 204 is connected to a second antenna 208 through a set or RF filters 210 and therefore periodically samples the signal received by the antenna 208 and filtered by the filters 209. The sampler output will thus include reflections of the transmitted pulses if the sampling occurs when those reflections are present in the received signal. In such a case, the timing of the sampling is related to the range at which the reflections occur, as discussed below in relation to the system shown in FIG. 2.

Such reflections arc detected by a signal processor 212, which includes a low pass filter 218 and detection circuitry 219 for informing a main control processor 214 of said detection. The control processor 214, in turn, calculates the range of the reflections, and 214 also sends control signals to the clock 202 so as to control the timing of the operation of the sampler 204 in relation to the operation of the transmitter 200 and sends signals to a Man Machine Interface 216. Man Machine Interface comprises an alarm which is triggered if a reflection is detected at or below a predetermined minimum range.

The receiver 206 can also receive other signals eg noise, any pulses generated by other electromagnetic sensor systems and any continuous wave signals generated by, for example, mobile telephone apparatus. Whilst some of these signals will be removed by RF filters 210 and the low pass filter 218, others will not and can in some circumstances cause spurious detections of reflections or incorrect calculations of range.

Such signals are dealt with in various different ways by the systems described below.

1. Thresholding

Figure 2:
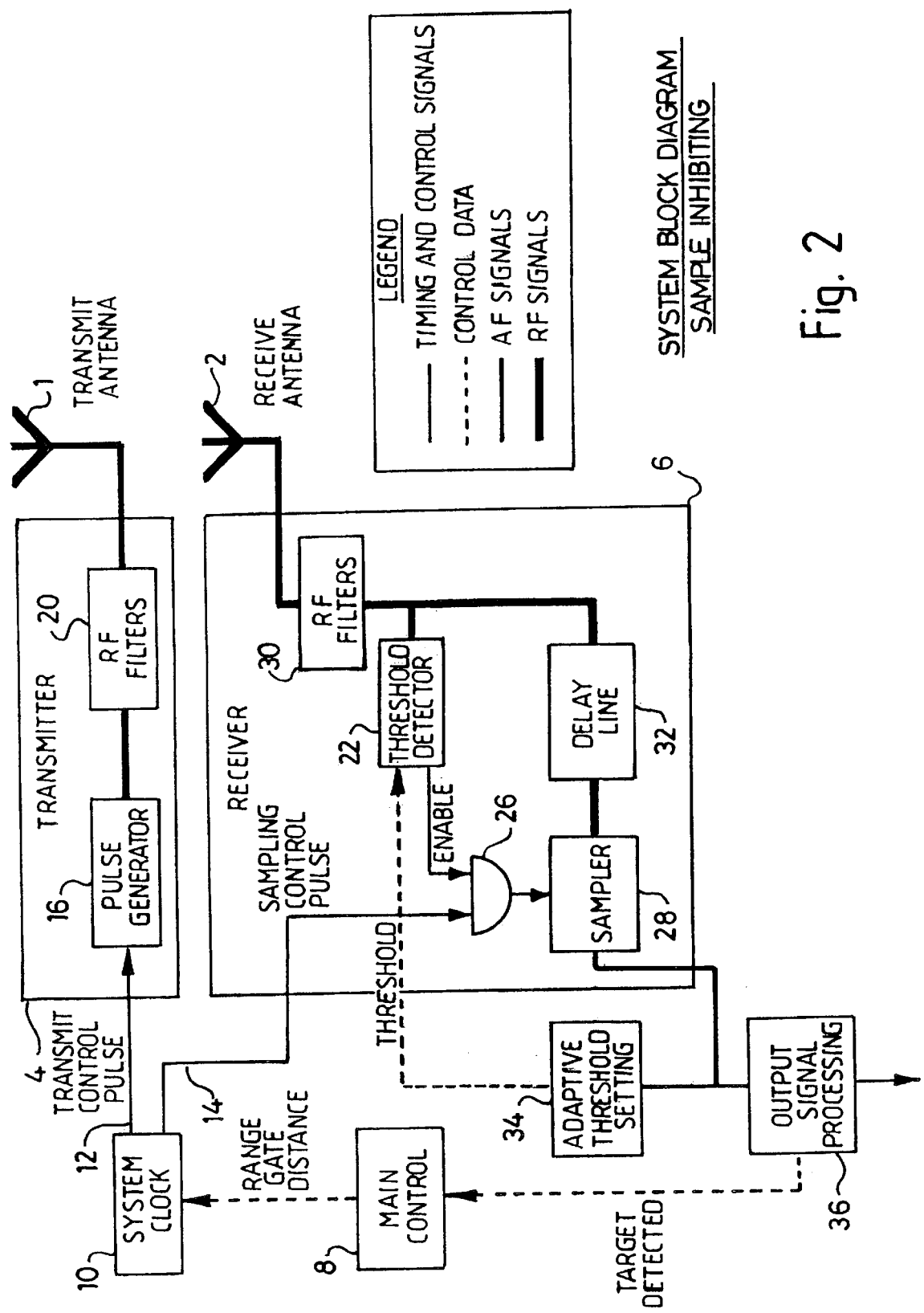
FIG. 2 is a block diagram of a first embodiment of impulse modulated electromagnetic sensor system in accordance with the first aspect of the invention.
Figure 19:
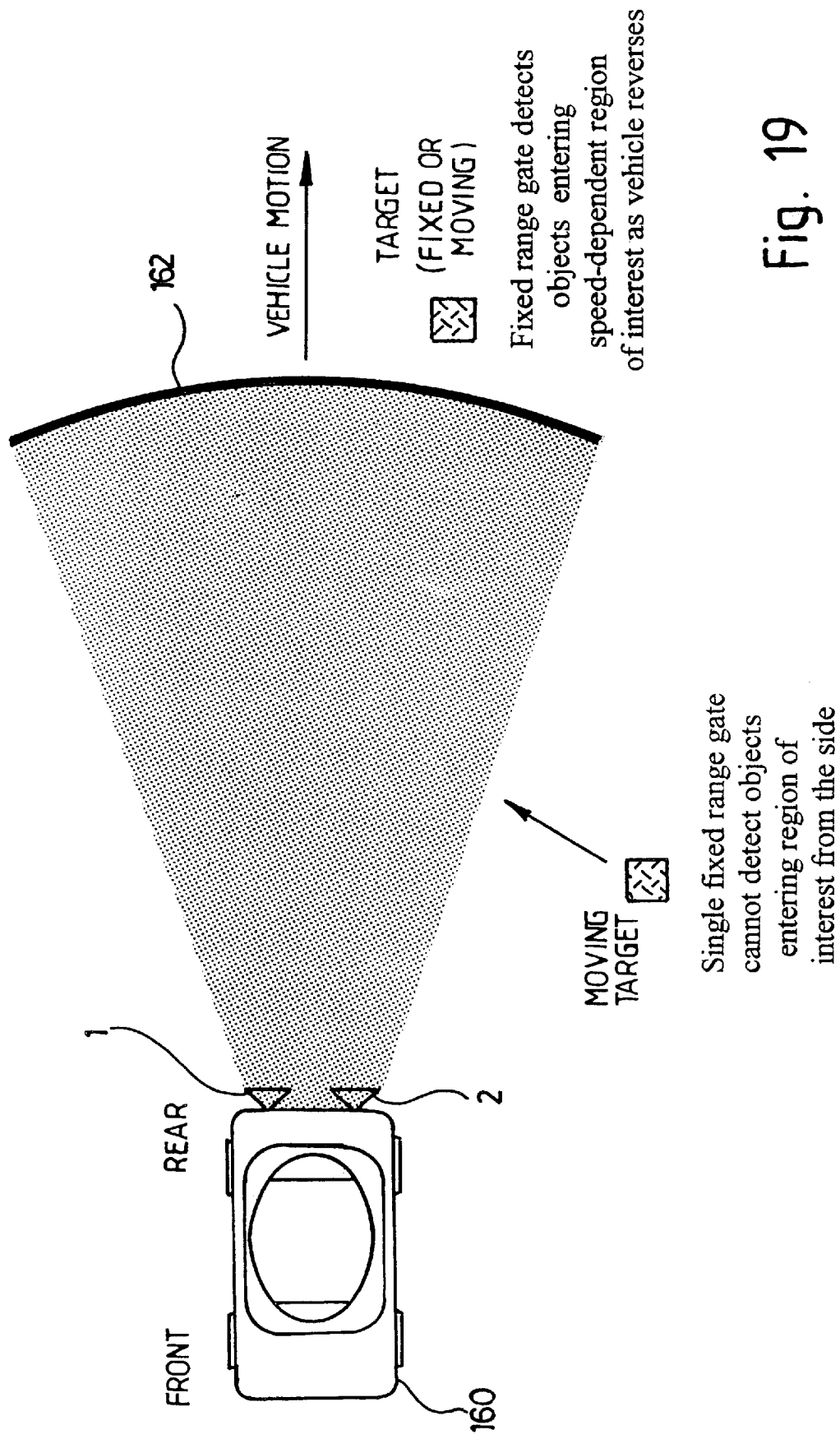
FIG. 19 shows a car fitted with any of the embodiments of system.

FIG. 2 shows an impulse electromagnetic sensor system which is adapted to be installed in a motor road vehicle, and which includes a transmit antenna 1 and a receive antenna 2 both of which are adapted to be mounted at a suitable position on the vehicle, for example, in the rear bumper (as shown in FIG. 19).

The antenna 1 is connected to a transmitter 4 which is operable to cause the antenna 1 to transmit a train of radio frequency pulses. Each pulse substantially consists of only a few cycles of electro magnetic energy. In the present case, the pulses are each of approximately 0.1–10 nanoseconds' duration, and the pulses are generated at intervals in the region of 0.1–10 microseconds such that the frequency of occurrence of the pulses (i.e. the pulse repetition frequency) is in the range of one hundred thousand to ten million pulses per second. The rf frequencies of the train of pulses lie in the range of 100 MHz–10 GHz, and each pulse has a rise time (i.e. the time taken for the pulse amplitudes to reach its peak from a quiescent level) of the order of tens of picoseconds to 10 nanoseconds.

Those pulses are reflected by objects or other vehicles near the vehicle in which the system is installed, and the reflections are received by the antenna 2 which is connected to a receiver 6 which periodically samples the signals being received by the antenna 2. The received signal is sampled at each of a succession of sampling periods, each of a similar duration to that of the transmitted pulse. Each of the sampled periods occurs at a predetermined delay (normally of 1 to 200 nanoseconds) after the transmission of a corresponding pulse by the antenna 1. If the antenna 2 receives the reflection of the corresponding transmitted pulse during a given sampling period, this is indicative of the transmitted pulse having travelled from the antenna 1 to a reflecting surface and back to the antenna 2 in the predetermined delay. Thus, the receipt of such a reflection is indicative of a surface lying on a range gate or shell which is defined by the condition that the combined distances from the antenna 1 and the antenna 2 to a given point on the gate or shell is the same as the distance which will be travelled by the transmitted and reflected pulse in the predetermined delay. Thus, if the antennas 1 and 2 are mounted at opposite end regions of the vehicle bumper, the range gate or shell will be in the shape of an ellipse, having the two antennas at its foci (for example as shown at 162 in FIG. 19).

The operation of the transmitter 4 and receiver 6 is controlled by means of a control unit 8. The unit 8 is connected to a system clock and pulse generator 10 which is operable to send a transmit control pulse along the line 12 to the transmitter, and a sampling control pulse along the line 14 to the receiver 6. The line 12 is connected to a pulse generator 16 which forms part of the transmitter 4.

The RF pulse generated by the pulse generator is fed to the antenna 1 via RF filters 20 which remove from the transmitted pulses frequencies which would otherwise interfere with nearby radio or telecommunications equipment in the same or other vehicles.

The sampling control pulses supplied along the line 14 are each generated after a predetermined delay from the transmission of a corresponding transmit control pulse, and each sampling control pulse is fed and to an input of an AND gate 26, the other input of which is connected to the output of the threshold detector 22. The output of the gate 26 is connected to a sampler 28. The threshold detector 22 and sampler 28 also have inputs which are connected to the receive antenna 2 via a set of RF filters 30 which remove interference from continuous wave sources, for example, radio broadcasts or mobile telephone transmissions, from the signals received by the antenna 2. The threshold detector 22 is connected directly to the filters 30 whilst the sampler 28 is connected to the filters 30 via a delay line 32 which may comprise a piece of transmission line of a suitable length.

If the signal received by the antenna 2 exceeds a threshold applied by the detector 22, the latter generates an inhibit pulse which is fed to the input of the gate 26. If the threshold is not exceeded, no such pulse is generated.

The delay associated with the delay line 32 is equal to the delay created by the threshold detector 22 and the gate 26, so that the portion of the delayed RF signal received by the sampler 28 from the delay line 32 when the sampler 28 receives a triggering signal from the gate 26 is the same as the portion of the signal on which the threshold detector 22 operated.

If any inhibit pulse is generated the gate 26 does not relay any triggering signal to the sampler 28 so that the latter does not sample the signal from the receive antenna if that signal exceeds the threshold. The sampler 28 averages the signals obtained by the sampling (for any given predetermined delay) so that the output from the sampler is an average of, for example, $10^4$ samples. This averaging helps to discriminate the reflections from random background noise, which will tend to be suppressed by the averaging process.

The output from the sampler 28 is connected to signal processor circuitry 36, similar to the processor 212 of FIG. 1, which analyses that output, to determine whether any reflections of pulses have been received.

The circuitry 36 can also perform a frequency analysis of the sampled signal which can be used to determine the relative speed of a reflective surface normal to the associated range gate or shell. The processing circuitry 34 supplies information back to the control unit 8 which can determine, from the object's position relative to the antennas on the vehicle or from its relative velocity whether there is a risk of a collision, and if so, will trigger an alarm (not shown), to warn the driver.

If the antenna 2 receives transmitted pulses directly from other impulse modulated electromagnetic sensor systems, these will generally be of a higher amplitude than the reflections of the signals from the antenna 1. Thus, if an appropriate threshold is set, most of the pulses received from other systems will be above the threshold whilst the majority of genuine reflected pulses will be below the threshold.

The threshold is set by means of adaptive threshold setting circuitry 34 which adjusts the threshold level so that large amplitude interference pulses are not sampled, but genuine reflections, background noise, etc are included. To that end, the circuitry 34 analyses the statistical distribution of amplitudes of signals sampled by the sampler 28 which will generally be a gaussian distribution. The circuitry 34 then sets a threshold equivalent to approximately three standard deviations above the mean of the amplitude. All the higher amplitude interfering pulses will consequently be excluded from sampling and, due to statistical variations in noise levels, approximately 0.3% of the genuine reflections will also exceed the threshold and therefore be excluded. However, it can be shown that the omission of the small proportion of genuine reflections has a negligible effect on the performance of the system as a whole. In addition, low amplitude interference pulses, which cannot be excluded by this thresholding technique, also have a negligible effect on the system performance.

A further discussion of the threshold setting process follows.

The "adaptive threshold setting" process determines the statistical distribution of the sampler (AF) output, under conditions so that it is known either that no target signal is present, or that the target signal can be ignored. For example, there could be a dedicated receiver channel which is sampled prior to the transmitted pulse. or the transmitted pulse could be periodically inhibited. The raw sampler output could also be used, provided that the mean value of that data (which corresponds to the target echo) varies only slowly and provided that the variability about the mean is independent of the mean level.

The statistics of the sampler output can then be used to determine the required threshold, correcting for any effect of the sampler itself. For example, if the standard deviation of the sampler output is 1 $\mu$V, and the sampler effectively averages the RF data over 16 samples. then we can infer that the standard deviation of the RF data is $\sqrt{16} \times 1$ $\mu$V=4 $\mu$V. Setting the threshold to 12 $\mu$V (3 standard deviations) will enable spikes to be eliminated. Some data will also be lost due to the thresholding process, but less than 0.3% with the threshold set at this level.

At short ranges or for strong targets the basic thresholding algorithm described above may cause the echo signal to be truncated. There may therefore need to be a minimum threshold.

It will be appreciated that, by appropriate generation of sampling control pulses, the system can be used to set a number of range gates. In such cases, a single threshold may be set for all range gates to reduce the component count. Alternatively. however, the threshold can be set independently for different range gates, for example, if the receiver circuitry is also connected to other antennae with different fields of view and hence different noise characteristics from the antenna 2.

Figure 3:
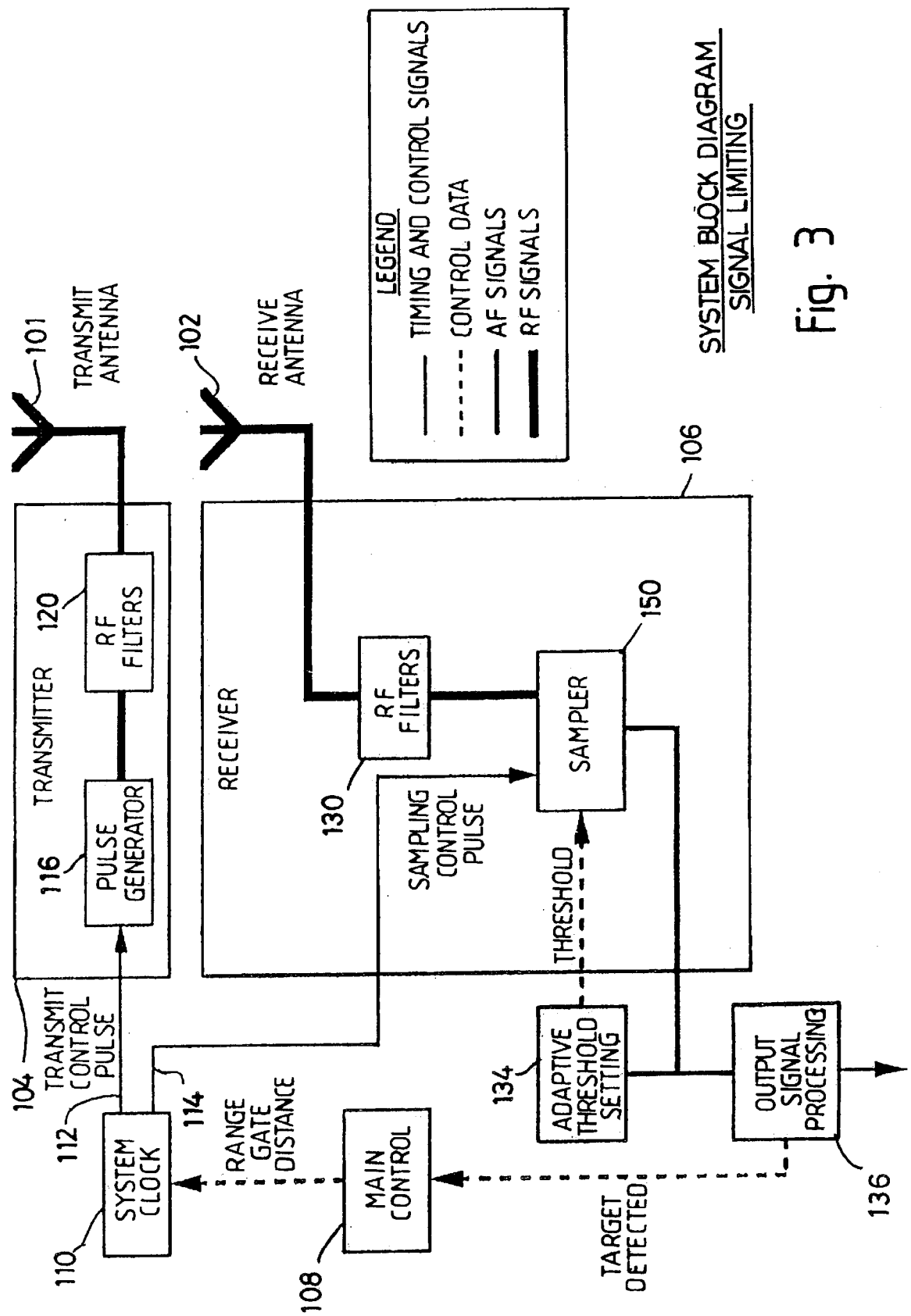
FIG. 3 is a block diagram of a second embodiment of such a system.

The system shown in FIG. 3 is similar in many respects to that shown in FIG. 2. Accordingly, the features which correspond to those of the system shown in FIG. 2 are denoted by the reference numbers of FIG. 2 raised by 100.

Thus, the second embodiment of system has a transmitter 104 which causes a transmit antenna 101 to generate a series of pulses. reflections of which are received by a receive antenna 102 connected to a receiver 104. However, instead of the threshold detector 22, delay line 32 and AND gate 26, the receiver has a modified sampler 150 which samples the signal received by the antenna 102, after filtering by RF filters 130, every time the sampler 150 receives a sampling control pulse along the line 114 from the circuitry 110.

When an interference pulse is received directly from another system, therefore, the sampler 150 is not disabled. However, the sampler 150 does include limiting circuitry which limits the amplitude of the sampler input to a maximum corresponding to a threshold which is set by the threshold setting circuitry 134.

Consequently, although the interference pulses will appear in the sampler output, their amplitude is limited so that they affect the processing of the sampled signal by the processing circuitry 136 to a reduced extent.

For example, it can be shown that if the threshold applied by the circuitry 134 is at t times the level of background noise, and if the rate of occurrence of interference pulses is r pulses per second, then the degradation in signal to noise ratio compared to the method EN used by the first embodiment of system is $(1+t^2 r)^{1/2}$. Thus, setting the threshold at three times the RMS background and assuming that the interference occurs on 10% of the samples, the degradation will be less than 1.5 dB.

FIG. 19 shows the system of FIG. 1 fitted on a motor car 160. The antennas 1 and 2 are attached to the rear bumper of the car 160, and provide a warning of the approach of an object from the rear of the car. That object could be another vehicle about to overtake the car or an obstacle towards which the car is reversing. Reference number 162 denotes a range gate or shell which is effectively defined by a given predetermined delay between the transmission of pulses from the antenna 1 and the sampling of the output from the antenna 2.

2. Intermittent Operation

Figure 4:
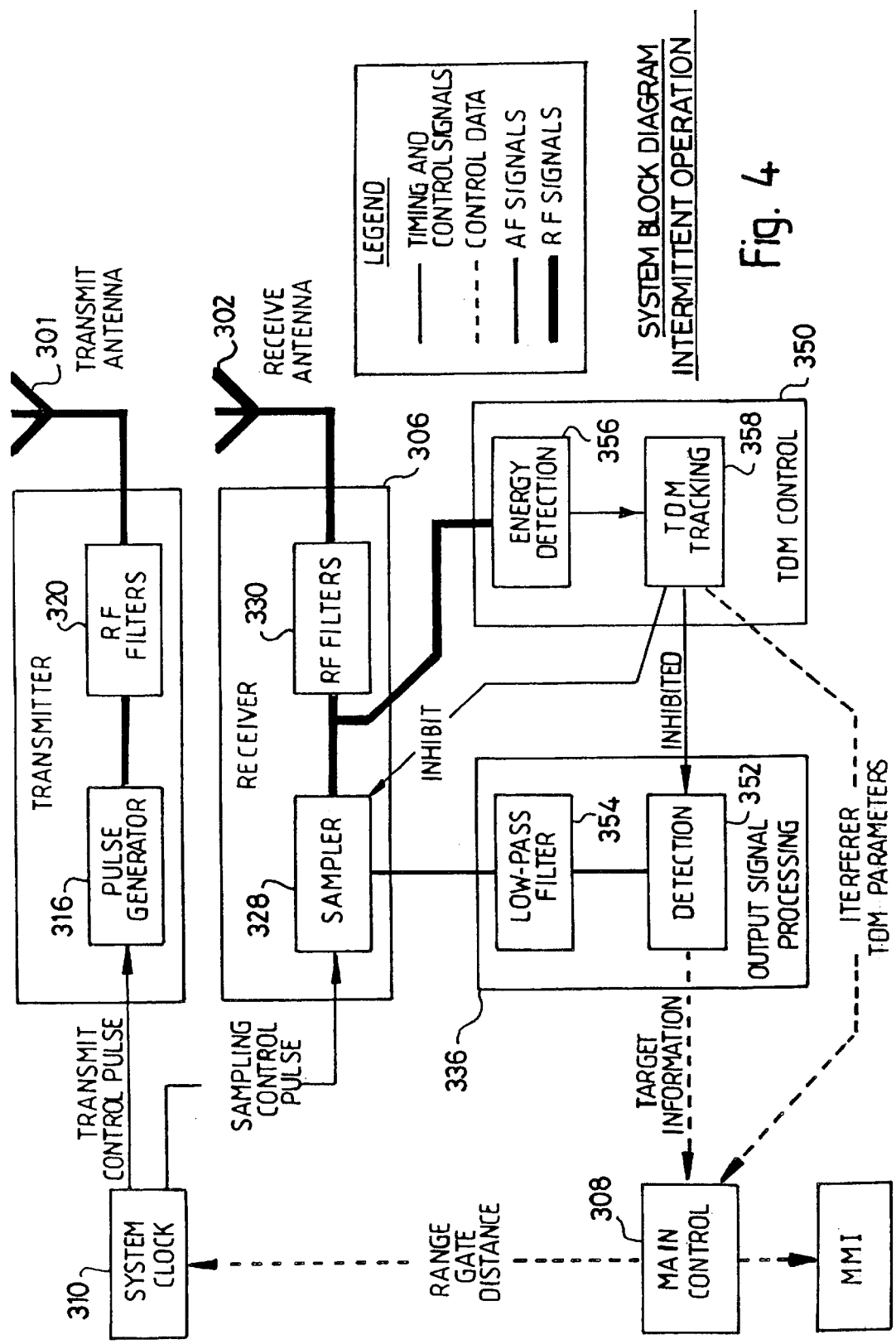
FIG. 4 is a block diagram of an embodiment of an impulse modulated electromagnetic sensor system in accordance with the second aspect of the invention.

The system shown in FIG. 4 has a number of components corresponding to those of the system, shown in FIGS. 1 and 2, and are therefore denoted by the reference numbers of FIG. 2 raised by 200.

In this case, however, the system includes circuitry 350 which is connected to tile receiver between the RF filters 320 and the sampler 328, and which is operable to detect any continuous wave signal which is received by the antenna 302 from, for example, mobile telephone equipment, and which is passed by the filters 330.

If those signals are of frequencies which arc multiples (or near multiples) of the frequency at which the sampler 328 operates, then they can be aliased to very low frequencies or to DC in the output of the sampler 328 (if the operation of the latter is not interrupted).

The low pass filter, here denoted by reference numeral 354 cannot remove such aliased signals, which but for the circuitry 350, would therefore cause the detector, here denoted by reference numeral 352, to send spurious data concerning target detection to the control processor 308.

The circuitry 350 prevents this happening by inhibiting the operation of the sampler 328 at appropriate times.

The circuitry 350 exploits the fact that many of the systems which generate continuous wave signals use non-continuous transmission. For example a mobile telephone uses a Time Domain Multiple Access protocol which operates with a 1 in 7 duty cycle at 270 Hz. Such a signal is detected by an energy detection sub module 356 of the circuitry 350. The sub module 356 performs a running power integration (over a time interval of 100 microseconds, say) of the signal fed to the circuitry.

The output of the sub-module 356 is fed to tile sub-module 358 which determines whether there is any periodic pattern in that output, corresponding to the times when the continuous wave RF signal is being transmitted. This information enables the sub-module to anticipate when the continuous wave signal will next be present at the input of the sampler 328, and to generate an inhibiting signal which prevents the operation of the sampler at that time.

At the same time, the tracking sub-module 358 sends an appropriate signal to the detector 352 so that the absence of any signal at the input of the detector 352 is not misinterpreted as the absence of a target. The sub-module 358 can also provide an indication to the processor 308 if for some reason energy is received while sampling is not inhibited, in order to suppress false alarms.

The TDM parameters (rate and duty cycle) are passed from TDM tracking to the main control 308 so that synchronisation of any scanning (of a range gate) with the TDM operating cycle can be avoided. For example, scanning should be controlled so that the interference occurs at a different point within the range on each pass: consecutive passes can then be combined to reconstruct the entire signal.

If a mobile telephone (operating on the TDMA protocol discussed above) uses an allocated radio channel which falls into the operational band of an impulse modulated electromagnetic sensor system, the system will be "blind" for approximately 4 ms in every 30 ms. This corresponds to a relatively small loss of information, which the target detection and tracking algorithms can readily accommodate.

In an alternative version of this system, the sub-module inhibits the operation of the sampler 328 (or detector 352) when it detects RF energy levels consistent with the presence of a continuous wave interferer. In such a case, the apparatus includes a delay line for delaying the supply of the received signal to the sampler 328 (or as the case may be the detector 352) so that the operation of the sampler 328 or detector 352 is synchronised with that of the sub-module 358.

3. Oversampling

Figure 5:
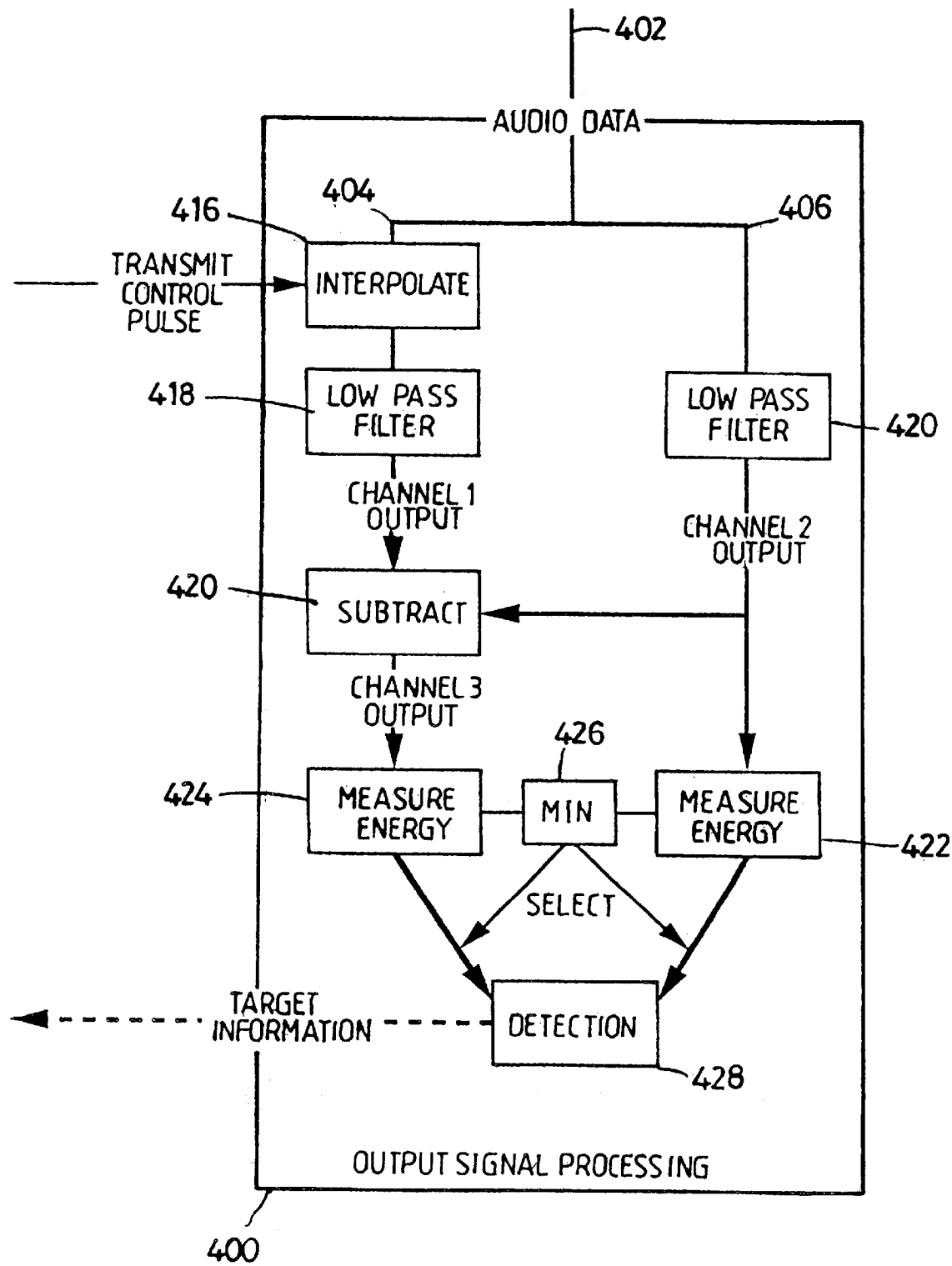
FIG. 5 is a block diagram of a first embodiment of an impulse modulated electromagnetic sensor system in accordance with the third aspect of the invention.

FIG. 5 shows a processor 400 for a system which employs oversampling to ensure that an RF continuous wave interference signal of a given frequency does not lead to false detections or targets or spurious indications of range, even if that frequency is a multiple of the pulse repetition frequency (ie the frequency of occurrence of the transmitted pulses).

The other components of the system are the same as those of the system shown in FIG. 4, with the exception of the detector circuitry 336, which is replaced by the processor 400, the circuitry 350, which is omitted and the control unit 308, which in this case is arranged to cause the system clock 310 to trigger the sampler 328 at a rate which is twice the pulse repetition frequency.

The AF output of the sampler forms the input to the processor 400 (at 402), in which the input is split into two branches 404 and 406. In that signal, the interval between successive samples is such that, if the receive antenna 302 is receiving reflections of transmitted pulses, those reflections can only appear in alternate samples of the AF signal. Thus each of the other samples occurs when the preceding transmitted pulse has travelled beyond the maximum range of the system.

Figure 8:
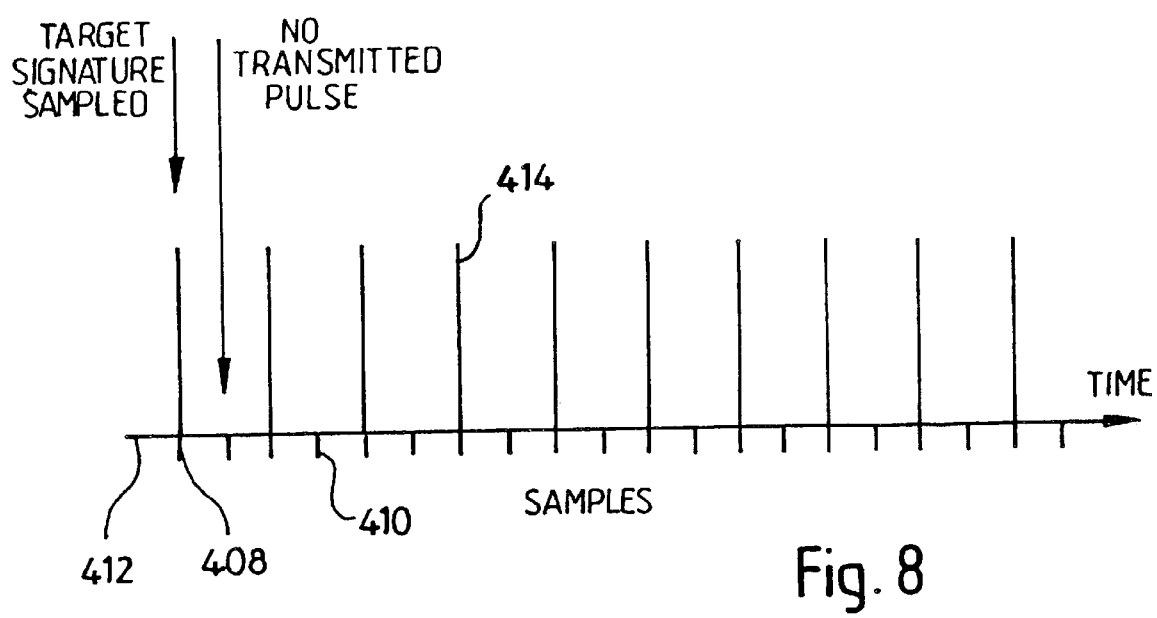

FIG. 8 illustrates the nature of the signal when a target is present at the current range gate of the system. The lines, such as 408 and 410, which extend below the time axis, 412 represent all the samples of the signal, while those lines, such as 408 or 414, which also extend above the axis 412 represent those samples in which the reflections of the pulses from the targets appear.

The signal in the branch 404 is fed to a first processor 416 which digitally filters the signal by removing the set of alternate samples, such as 410, in which no target reflection can appear, thus leaving only samples which contain the target reflection together with background noise and interference signals (if present). The filtered signal also only has half the samples (and hence half the sampling rate) of the input signal.

The processor 416 then generates additional samples at times corresponding to the times of occurrence of the samples which were removed. Each additional sample is generated by a process of interpolation from the samples in the filtered signals occurring immediately before and after the additional samples. By virtue of the additional samples the output signal from the processor 416 has the same sampling rate as the input signal.

That output is fed through a low pass filter 418 to form a first channel. The second branch 406 also includes a low pass filter 420 in which the raw input signal is filtered to obtain a second channel.

The second channel is fed to energy measuring circuitry 422 and to a digital subtractor, to which the first channel is also supplied. The subtractor subtracts the second channel from the first to obtain a third channel, which is output as the modulus of the difference between the first and second channels and is fed to energy measuring circuitry 424.

A comparator 426 compares the energy detected by the circuitries 424 and 422 to determine which of the second and third channels contains the smaller energy, and instructs detector circuitry to select that channel for analysis.

The principals of the operation of the system will now be explained.

In the second channel which in this example is sampled at 2 MHz (twice the pulse repetition frequency), the target echo will be present in alternate samples, corresponding to two components, each having one half of the 'raw' target amplitude: a low-frequency component (near DC) together with a high frequency component (near 1 MHz). Interferers of frequency (2N+1) MHz will be aliased to 1 MHz in this second channel. Low-pass filtering this channel will therefore reject interferers of frequency (2N+1) MHz.

Interferers of frequency 2N MHz will, however, be present as low-frequency aliases in both the first and the second channels. However, in the third channel the aliased interferer will be cancelled out, leaving the target echo alone, again of one half the 'raw' amplitude. Note that the additional samples are inserted by the processor 416 to enable the channels to be subtracted digitally.

Figure 7:
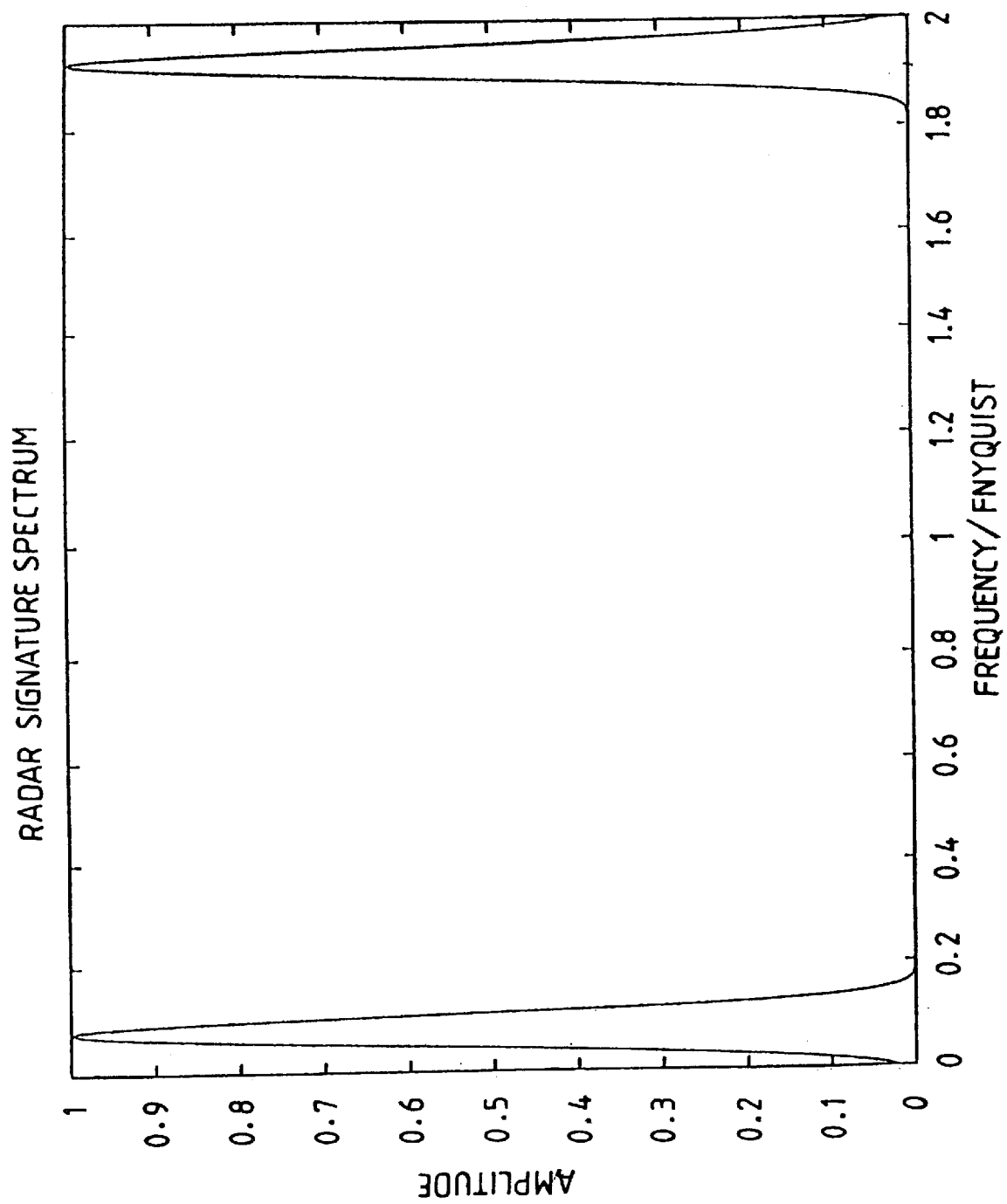
FIGS. 7 to 16 are graphs illustrating the processing of various signals received by either of the systems shown in FIGS. 5 and 6.

FIG. 7 is a representation of the spectrum of the signature returned by a particular target moving at a particular normal velocity relative to the range gate. as would be measured (in the absence of noise) by the standard impulse modulated electromagnetic sensor system illustrated in FIG. 1. The spectrum has a relatively narrow bandwidth compared to the sampling frequency. FIG. 7 shows the two-sided spectrum with negative frequencies aliased to positive frequencies 430 above the Nyquist frequency tone half of the sampling frequency).

Figure 9:
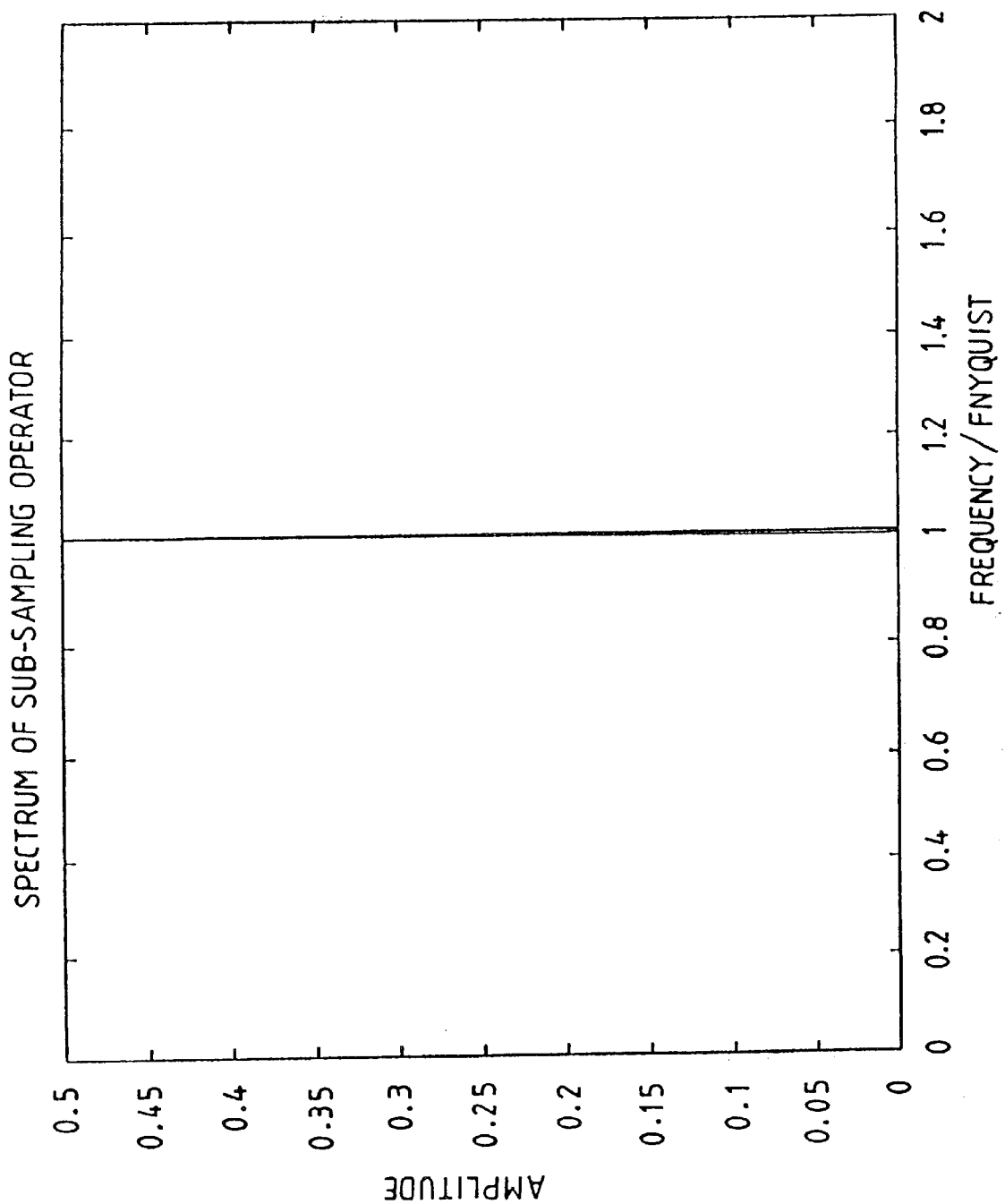
Figure 10:
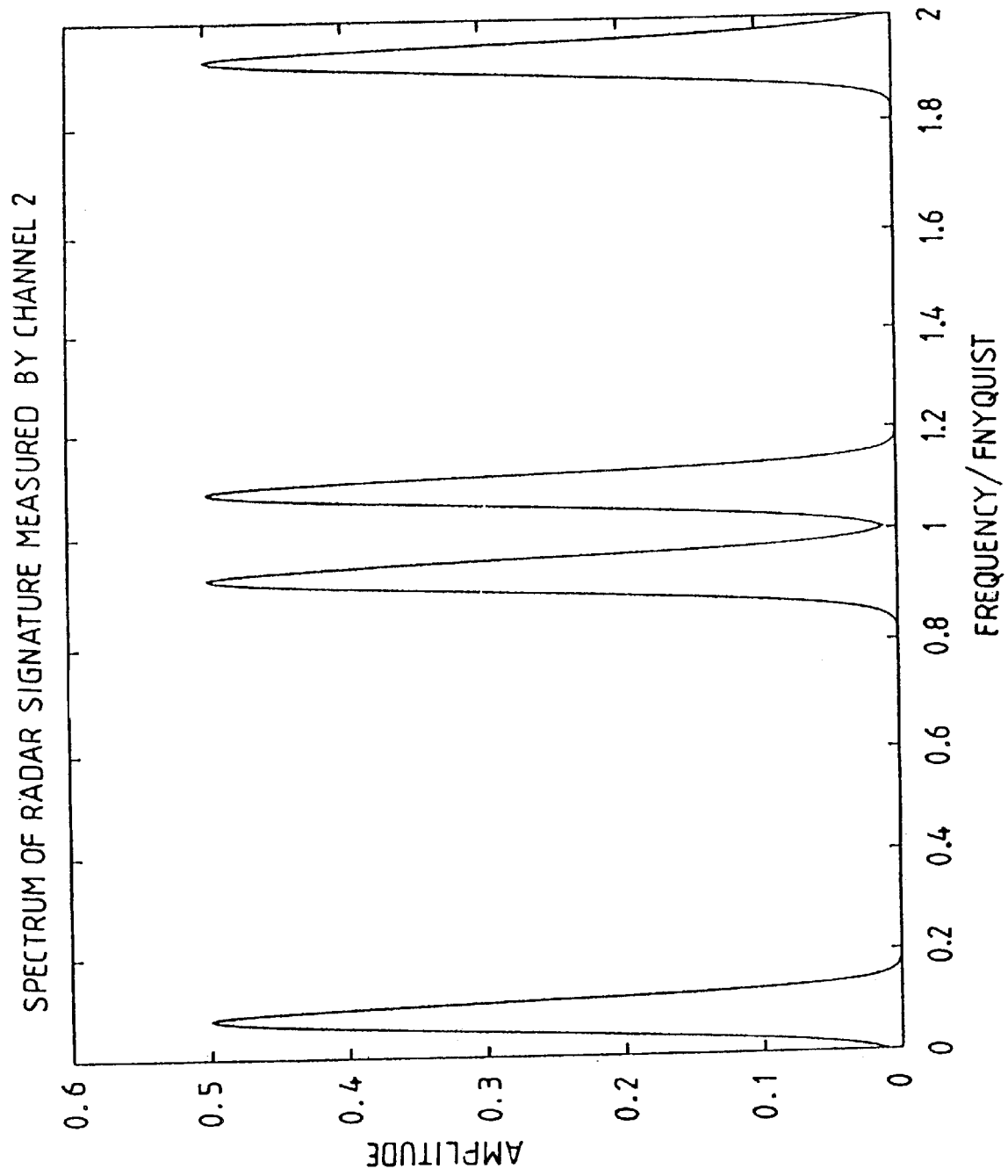

Channel 2 is a direct output from the sampler, with alternate samples containing any reflections of the pulses and no such reflections as shown in FIG. 8. The spectrum of the same signal on Channel 2 is therefore equivalent to the result of the convolying the Spectrum of FIG. 4 with the spectrum of the sub-sampling operator of FIG. 9. The resulting spectrum is given in FIG. 10.

Figure 11:
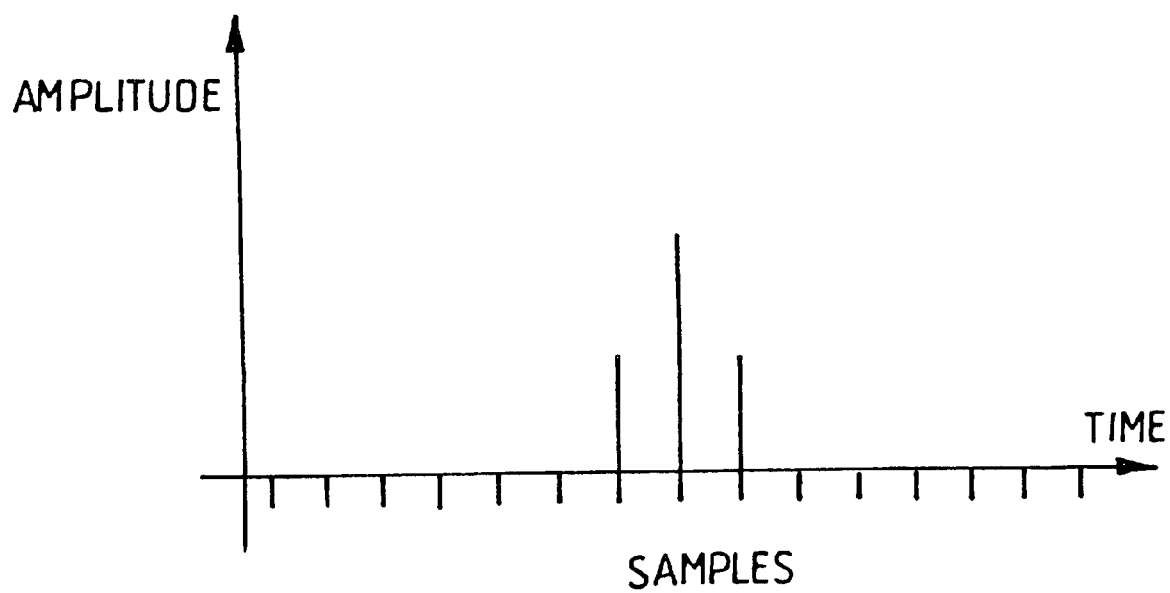
Figure 12:
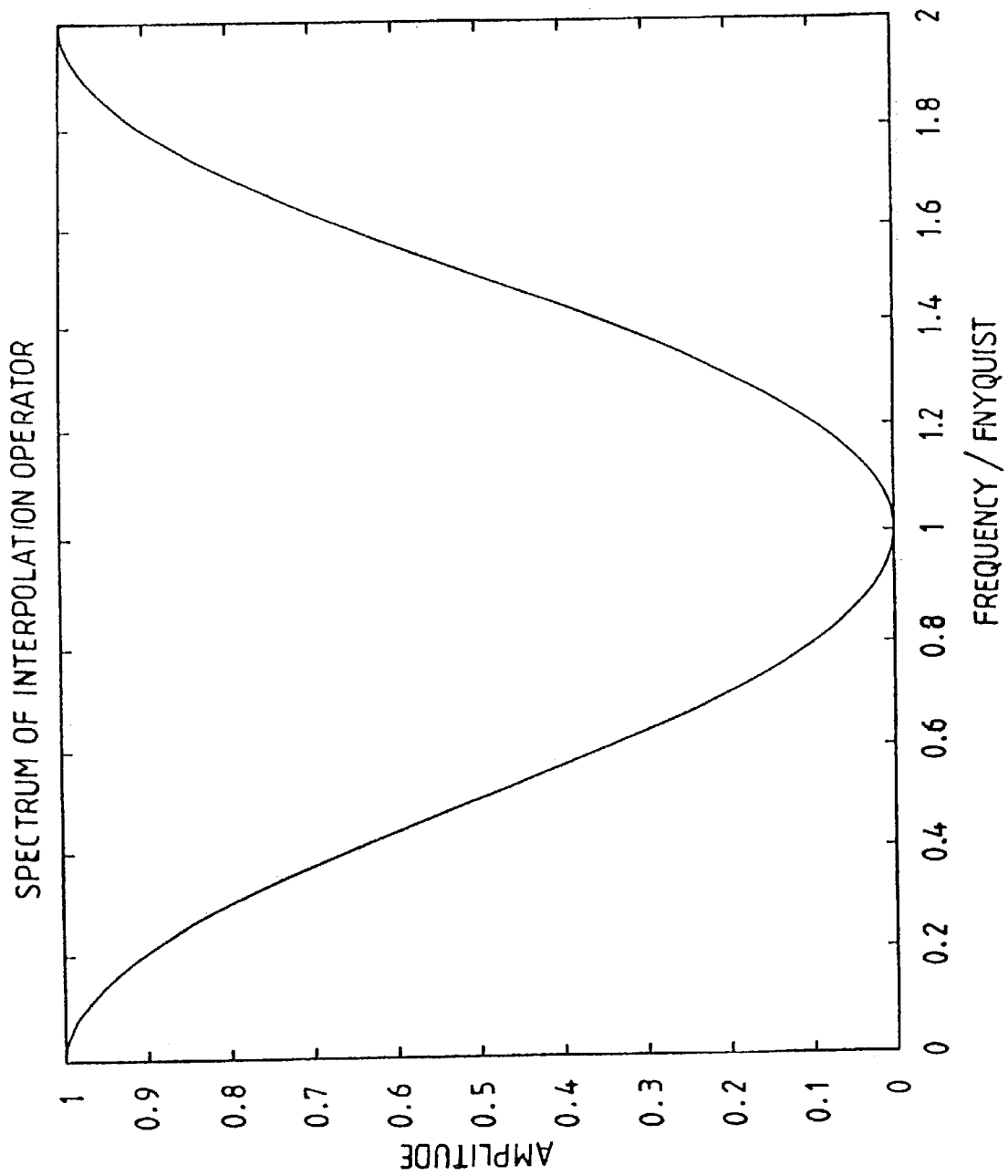
Figure 13:
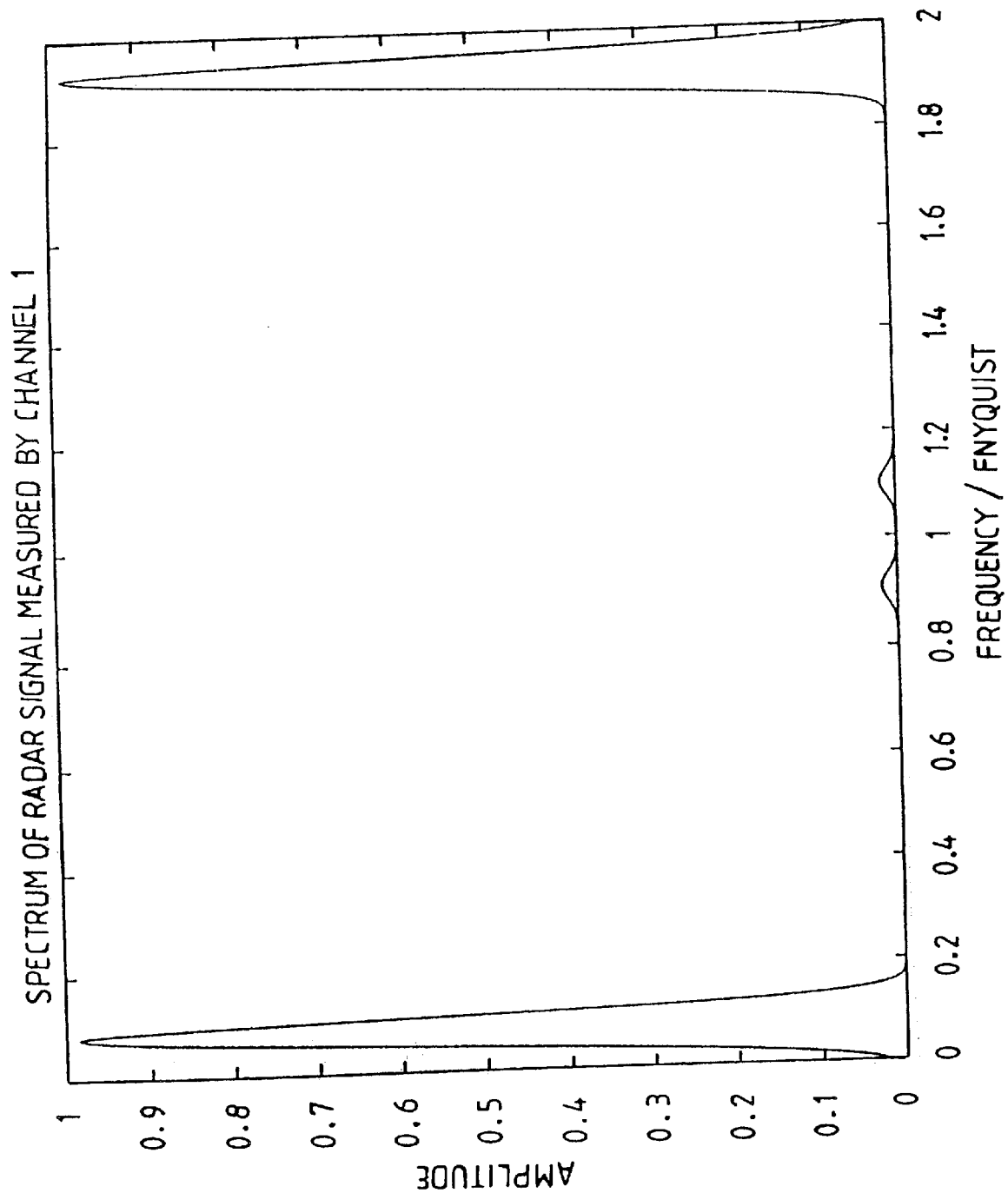

Channel 1 is obtained from Channel 2 removing the "zero" samples and interpolating to "fill-in" data when no pulse is transmitted. This interpolation is equivalent to convolution of Channel 2 with the waveform shown in FIG. 11 so that the Channel 1 spectrum can be obtained by multiplying the Channel 2 spectrum by the spectrum of the interpolation operator of FIG. 12, resulting in the Spectrum shown in FIG. 13.

Figure 14:
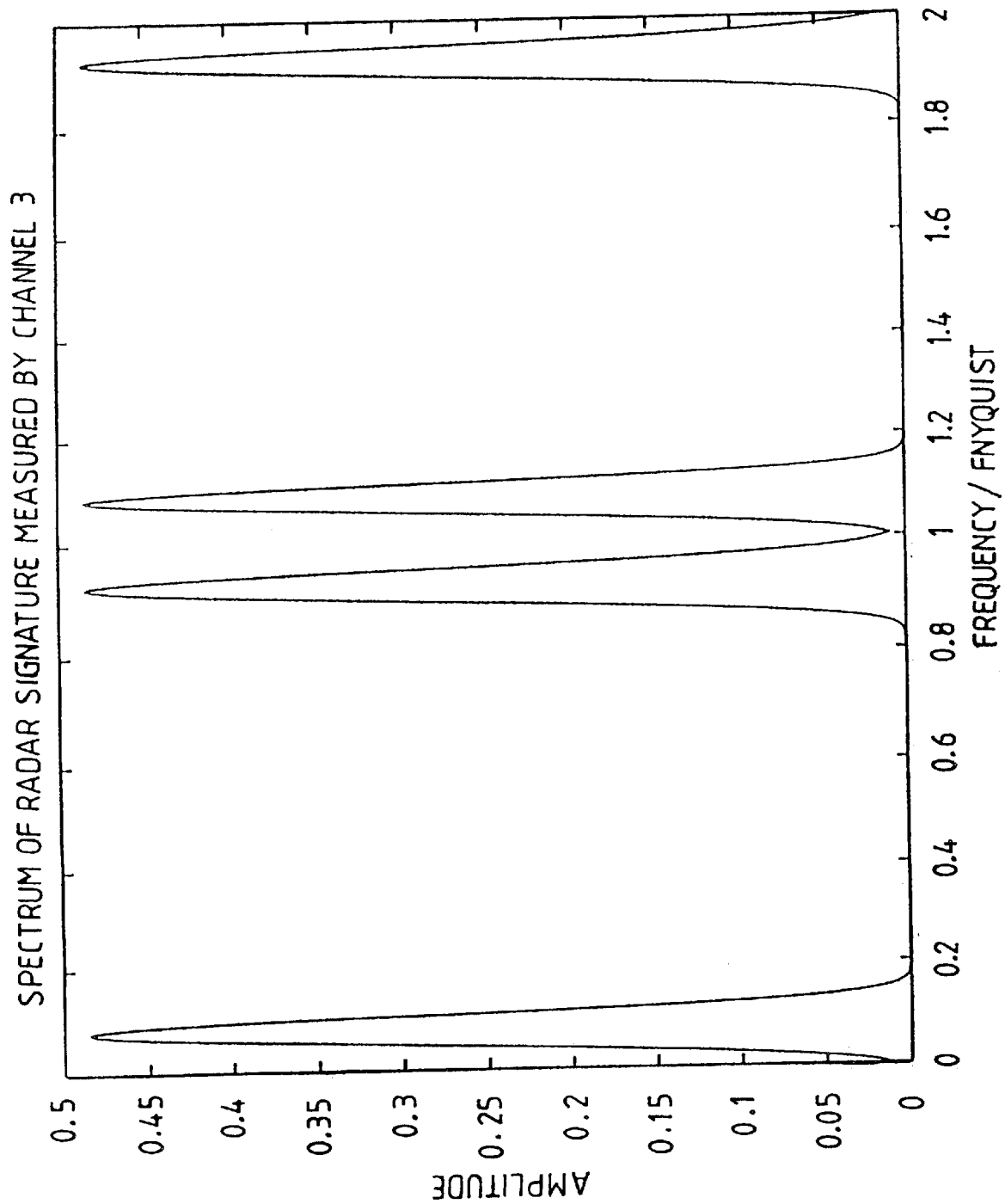

Finally, Channel 3 is formed by subtracting Channel 2 from Channel 1, giving the spectrum shown in FIG. 14.

Figure 15:
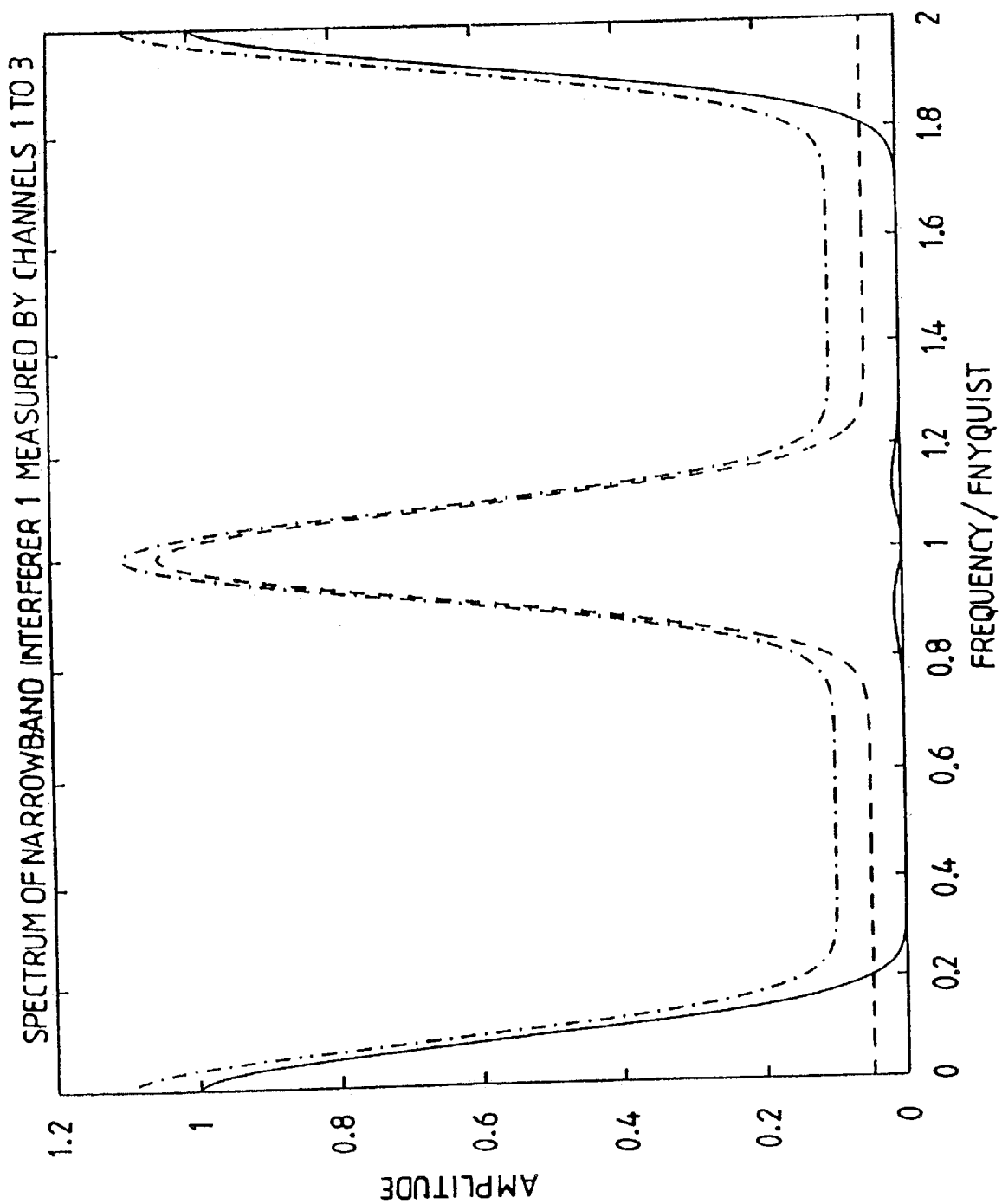

Consider now a continuous wave narrow-band interferer, aliased to near-DC at the pulse repetition rate. There are two cases to consider. In the first case the interferer has a frequency which is a multiple of half the sampling frequency, and is therefore aliased to the PRF in Channel 2. FIG. 15 shows the output spectra from Channel 1 (solid), Channel 2 (dashed) and Channel 3 (dot-dashed), with the three channels offset so that the spectra can be clearly distinguished. Note that the interferer will be present as a low frequency alias in both Channels 1 and 3.

Figure 16:
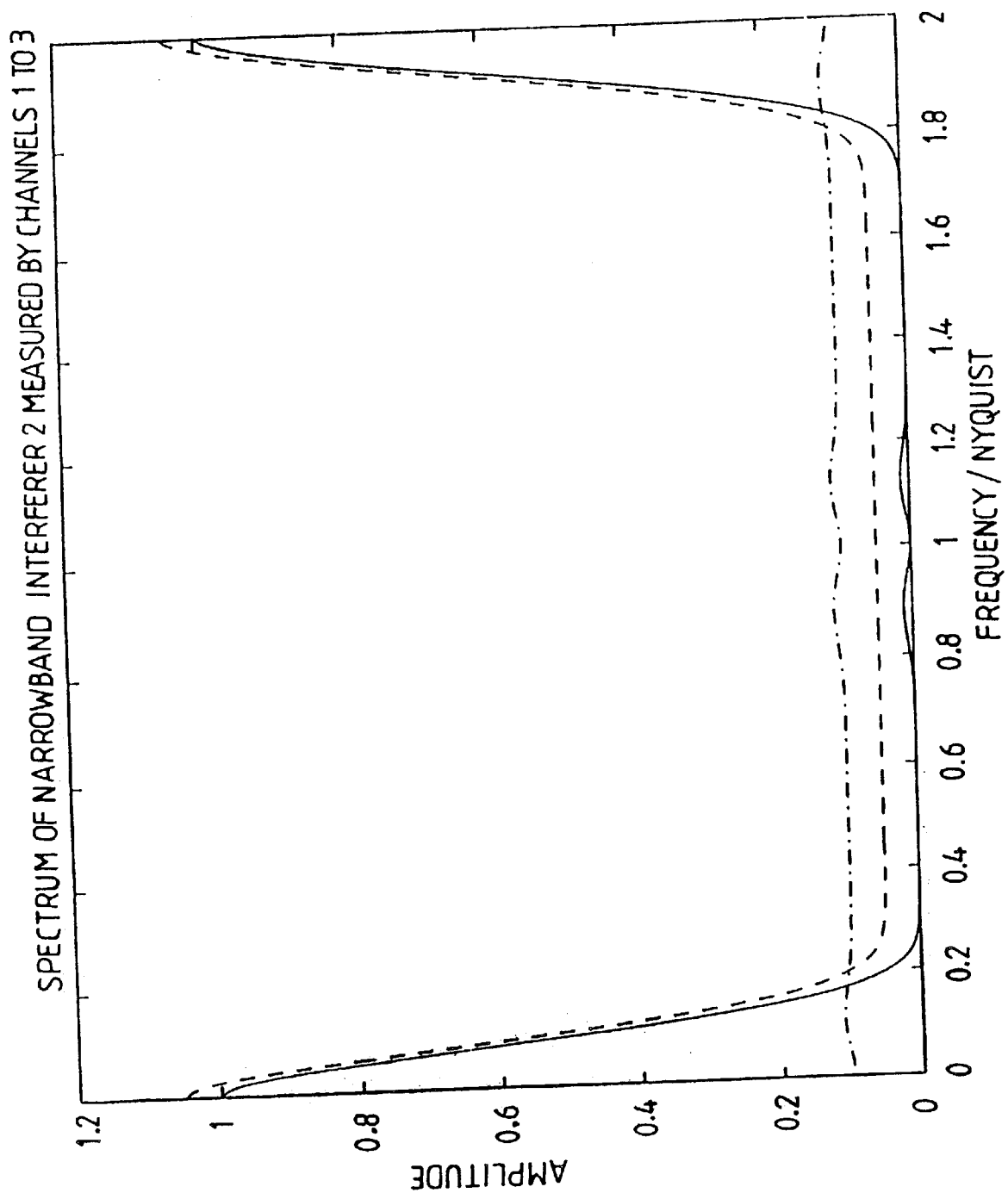

In the second case, the interferer has a frequency which is a multiple of the sampling rate and is therefore aliased to the DC in Channel 2. FIG. 16 shows the output spectra as before, but in this case the interferer is almost entirely suppressed in Channel 3. The residual low-frequency energy visible in Channel 3 is a consequence of using a crude interpolation filter. Better rejection can be achieved with a better filter.

This leads to a simple interference rejection scheme, as illustrated in the block diagram of FIG. 5 which gives more detail of the "Output Signal Processing". In FIG. 5 the incoming audio data is assumed to be digitised at the full sampling rate and is processed by two separate paths. On one path the data is low-pass filtered to form Channel 2; on the other it is interpolated and then low-pass filtered (forming Channel 1) before subtracting Channel 2 to form Channel 3. The low-frequency energies in Channels 2 and 3 are compared. and the channel with the lower energy (and therefore not contaminated by the presence of an interferer) is used for target detection.

Note that the number of alternative, completely equivalent implementations are possible. For example, channels 1 and 2 may be subtracted before low-pass filtering. Low-pass filtering may also include sub-sampling.

Figure 6:
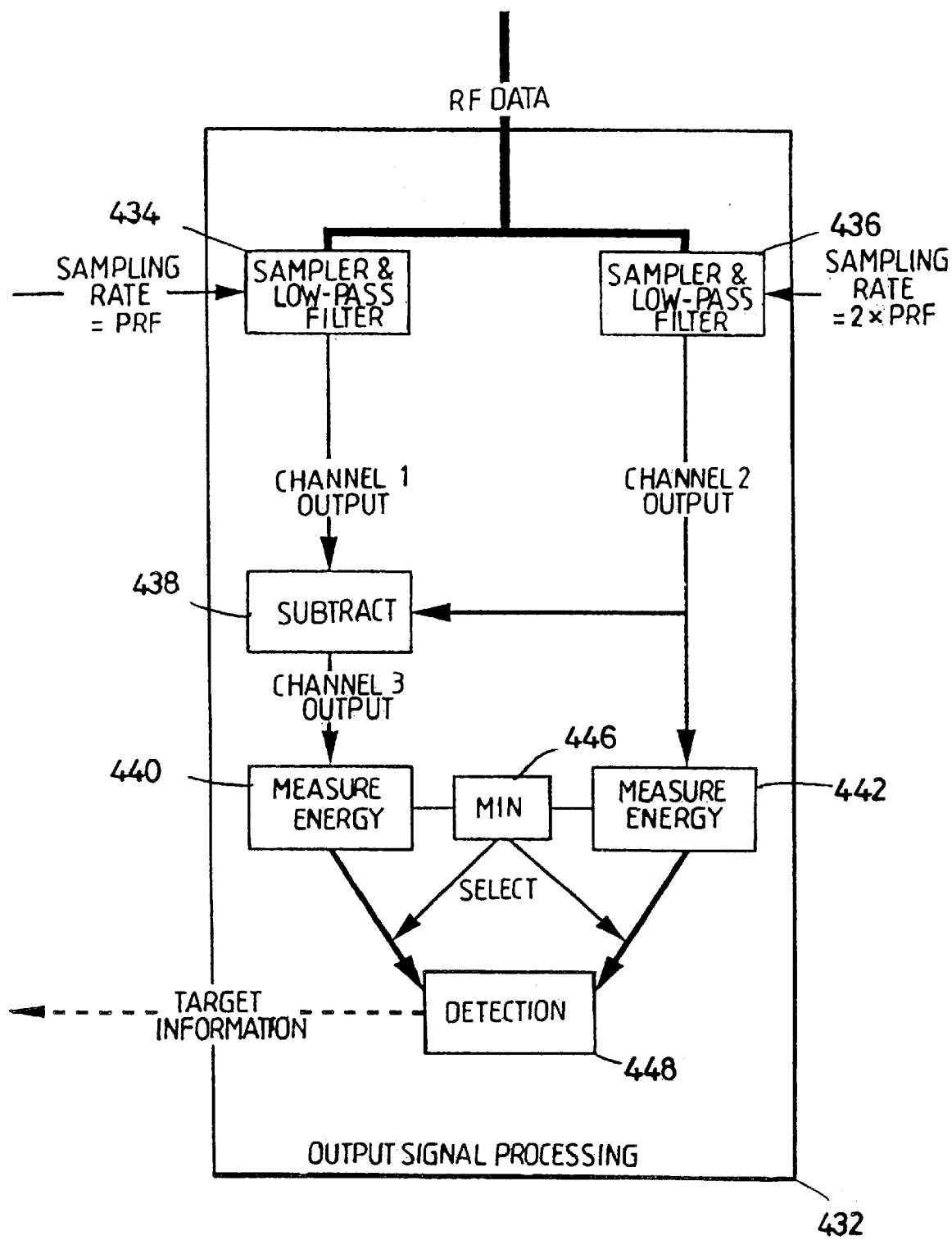
FIG. 6 is a block diagram of a second embodiment of system also in accordance with the third aspect of the invention.

An alternative analogue implementation is shown in FIG. 6, in which an alternative processor 432 to the processor 400 is shown. This processor is connected directly to the output of the RF filters of the signals received by the receive antenna, and has its own samplers 434 and 436 which replace the single sampler of the system shown in FIG. 5. The samplers 434 and 436 are triggered at the PRF and twice the PRF respectively. Each sampler has a capacitor as its output to hold the received signal voltage, which therefore acts as a low-pass filter. The two channels are subtracted in the subtracter 438 to form Channel 3, the energies are measured using circuitries 440 and 442 and compared by comparator 446, which selects the channel with the lowest energy for target detection by the detector 448. In this analogue implementation the interpolation operation is implicit.

4. Pulse Repetition Freqeuency Agility

Figure 17:
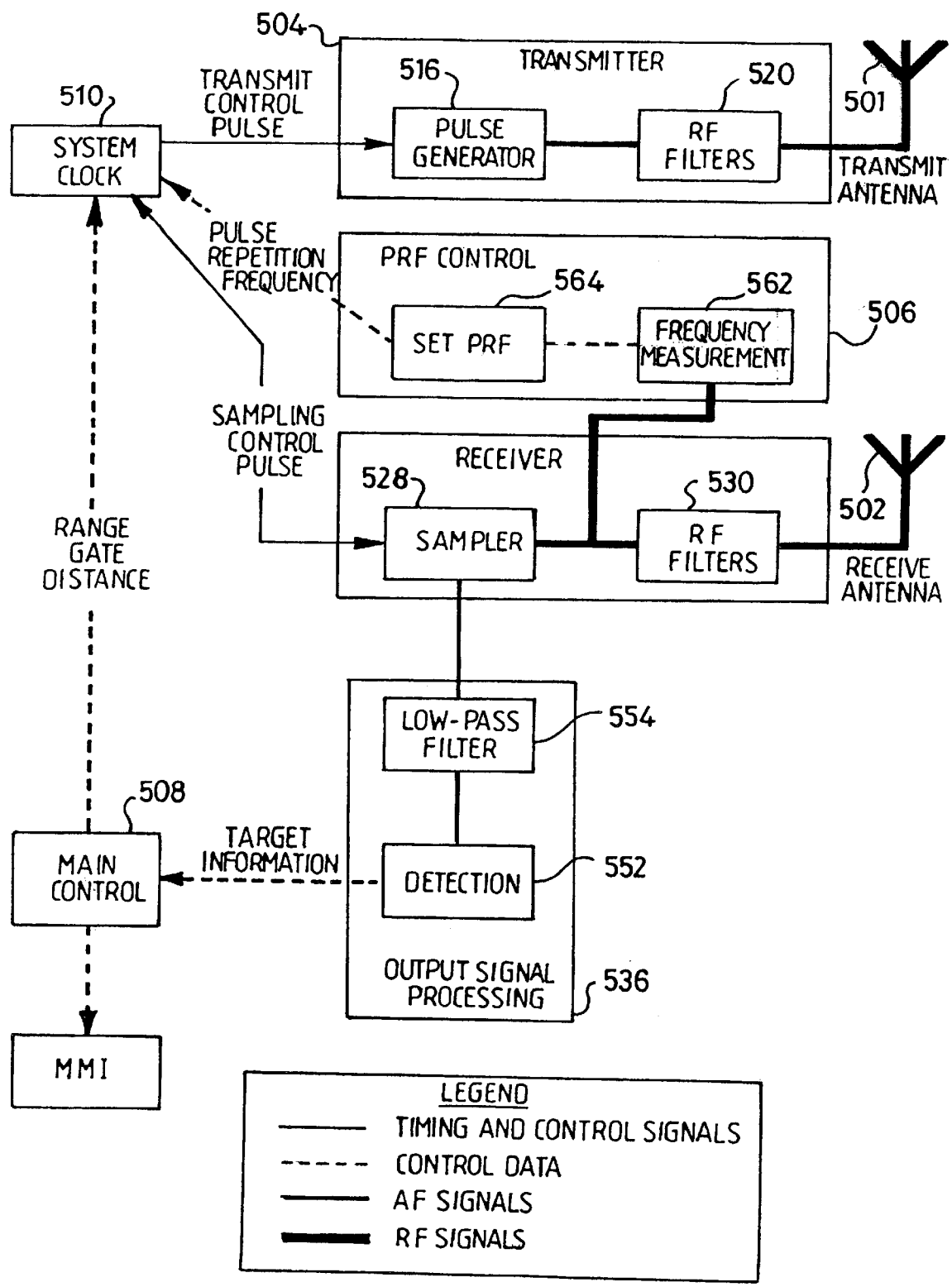
FIG. 17 is a block circuit diagram of an impulse modulated electromagnetic cut sensor system in accordance with the fourth aspect of the invention.

With reference to FIG. 17, a system which controls the pulse repetition frequency (and sampling rate) in order to avoid interference from continuous wave signals has a number of components identical to those of the system shown in FIG. 4. Those components are indicated by the reference numerals of FIG. 4, raised by 200.

In addition, the system includes a PRF control module 560 connected to the output of the RF filters 530 and to the system clock 510.

The module 560 comprises a frequency measurement sub-module 562 which monitors the output from the filters 530 for any strong narrow band continuous wave signal and measures the frequency of such a signal. Data identifying the signal is then supplied to a second sub-module 564 for determining a pulse repetition and sampling frequency which will cause the continuous wave signal to be aliased to a frequency, in the output of the sampler 528, at which it will not interfere with the target echo.

The sub-module 564 also sends control data to the clock 510, causing the latter to operate the pulse generator 516 and the sampler 528 at the required rates so that the pulse repetition and sampling frequency is the same as that determined by the sub-module 564.

More specifically, if the RF continuous wave signal is to be aliased to the Nyquist frequency in the sampler output and has a frequency of $f_{int}$ the sub-module determines a frequency multiplier N using the formula.

$$N = \frac{f int}{PRFnom} - 0.5 \quad (1a)$$

where PRF is a nominal PRF (eg 1 MHz) the operator [] gives the nearest integer. In an ideal system the optimal PRF is then determined:

$$PRF = \frac{f int}{(N + 0.5)} \quad (1b)$$

This approach requires the ability to control the PRF to any value in a continuum. It is also possible to define a set of alternative PRFs for any fixed frequency band so that any interferer within the frequency band will be aliased out of the AF pass band. For example, over the frequency band 2–4 GHz, one of three PRFs 999875 HZ, 1000000 Hz, and 1000125 Hz can always be chosen so that an interferer is aliased out of the DC–250 kHz band. Different numbers of discrete frequencies are needed for different operational RF and AF bandwidths.

In practice, there will be an advantage in not aliasing the interferer to the Nyquist frequency, in order to reject harmonics. For example, if the interferer is aliased to $f_{Nyquist}$ then its first harmonic will be aliased to DC. However, if the interferer is aliased to $0.4f_{Nyquist}$ then its first and second harmonics will be aliased to $0.2f_{Nyquist}$, its third to $0.4f_{Nyquist}$, and its fourth to DC. The amplitude of the fourth harmonic will in general be significantly lower than the amplitude of the first harmonic.

In such cases 0.5 is replaced by 0.4 in both the above equations (1a and 1b)

This approach can be extended to deal with multiple interferers in certain combinations—for example interferers at 2 GHz and 3.0005 GHz are simultaneously aliased to 400 kHz by setting the PRF to 999300 Hz.

5. Multi-Frequency Operation

Figure 18:
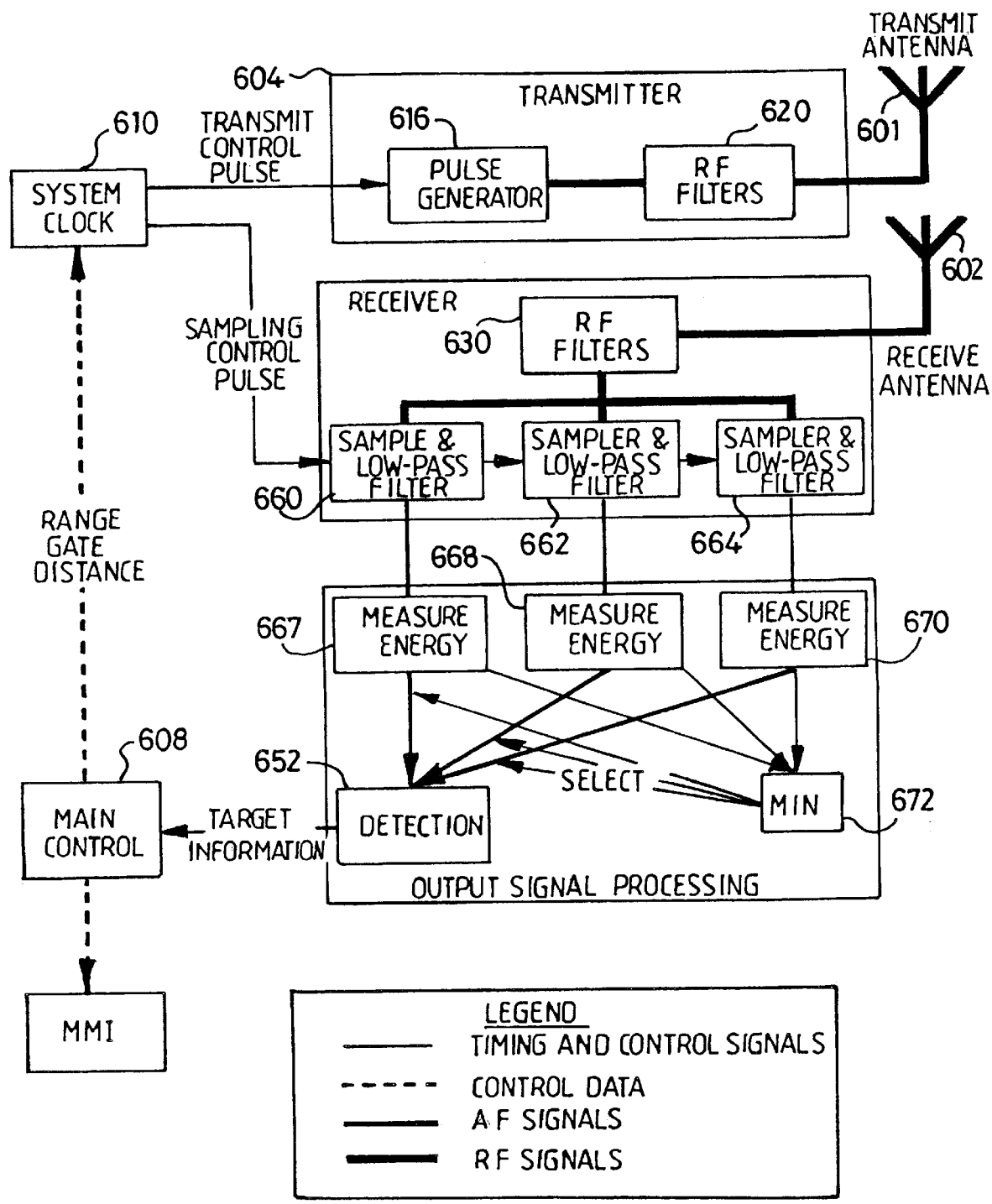
FIG. 18 is a block circuit diagram of an impulse modulated electromagnetic sensor system in accordance with the fifth aspect of the invention.

This technique is applied by the system shown in FIG. 18, in which components corresponding to those of the system shown in FIG. 4 are denoted by the same reference numerals, raised by 300.

This system has three samplers (and associated low pass filters) 660, 662 and 664 which are triggered by the same sampling control pulse from the clock 510, and which therefore sample the output from the filters 630. The filters 630 simultaneously filter the output of the antenna 602 into three separate frequency bands, each of which forms an input for a respective sample.

In one example the bandwidth of the transmitted pulses is 5–8 GHz. and the three channels operate at 5–6 GHz, 6–7 GHz and 7–8 GHz.

Although this system uses three channels, any suitable number of channels may be used and passed to a corresponding bank of samplers/low-pass filters. Each sampler is triggered by the same sampling pulse, so that each forms a range gate at the same range. The energy in each channel is determined, and the signal from the channel with minimum energy is used for target detection.

The output of each sampler's low pass filter is fed to a respective one of three energy measuring circuits 667, 668 and 670. The channel with the lowest energy is selected by a comparator 677 for further analysis. by the detector 652.

Although the invention has been described in relation to motor road vehicles, the invention applies equally for use on other vehicles such as trains, boats etc.

What is claimed is:

1. A electromagnetic sensor system comprising transmitting means for transmitting a radio frequency signal, receiving means for receiving reflections of said signal from remote objects, sampling means operable to sample the received reflected signal or a signal processing the sampled signal, and operable to detect said reflections in the sampled signal, and to determine information on the presence, position and/or range of said object, and filter means for preventing radio signals transmitted by other sources or noise spikes from causing interference which results in spurious detections or indications of range by the processing means, wherein the filter means has a threshold detector for preventing operation of the sampling means when a characteristic of the received reflected signal exceeds a threshold.

2. A electromagnetic sensor system according to claim 1, in which the filter means consists of a non-linear filter means.

3. A electromagnetic sensor system according to claim 1, in which the threshold detector determines whether the received signal is above said threshold and, if it is not, generates an enabling signal for enabling the sampling means to operate, the system further compromising delay means for delaying the passage of the received signal from the receiving means to the sampling means so that the operating of the threshold detector and the sampling means are synchronized in relation to the received signal.

4. A electromagnetic sensor system according to claim 2, which electromagnetic sensor system further comprises a threshold setting means for adaptively adjusting the threshold applied to ensure that the majority of genuine reflected pulses lie below the threshold.

5. An electromagnetic sensor system according to claim 1 in which the transmitting means, in use, generates a train of radio frequency pulses, the system functioning as an impulse radar system.

6. A vehicle fitted with an electromagnetic sensor system according to claim 1.

7. A vehicle according to claim 6, in which the vehicle is a motor road vehicle.

8. A electromagnetic sensor system comprising transmitting means for transmitting a radio frequency signal, receiving means for receiving reflections of said signal from remote objects, sampling means operable to sample the received reflected signal processing means for processing the sampled signal, and operable to detect said reflections in the sampled signal, and to determine information on the presence, position and/or range of said object, and filter means for preventing radio signals transmitted by other sources or noise spikes from causing interference which results in spurious detections and indications of range by the processing means, wherein the filter means has a threshold detector for inhibiting operation of the sampling means when a characteristic of the received reflected signal for inhibiting exceeds a threshold.

* * * * *